US009838917B2

(12) United States Patent
Vikberg et al.

(10) Patent No.: US 9,838,917 B2
(45) Date of Patent: Dec. 5, 2017

(54) ESTABLISHMENT OF DUAL CONNECTIVITY

(71) Applicant: Telefonaktiebolaget L M Ericsson (publ), Stockholm (SE)

(72) Inventors: Jari Vikberg, Järna (SE); Icaro L. J. da Silva, Bromma (SE); Gunnar Mildh, Sollentuna (SE); Johan Rune, Lidingö (SE); Pontus Wallentin, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/435,290

(22) PCT Filed: Feb. 13, 2015

(86) PCT No.: PCT/SE2015/050173
§ 371 (c)(1),
(2) Date: Apr. 13, 2015

(87) PCT Pub. No.: WO2016/130061
PCT Pub. Date: Aug. 18, 2016

(65) Prior Publication Data
US 2016/0242080 A1     Aug. 18, 2016

(51) Int. Cl.
*H04W 4/00*     (2009.01)
*H04W 36/00*    (2009.01)
*H04W 76/02*    (2009.01)

(52) U.S. Cl.
CPC ..... *H04W 36/0027* (2013.01); *H04W 76/025* (2013.01); *H04W 36/0033* (2013.01)

(58) Field of Classification Search
USPC .......................................... 370/329; 455/436
See application file for complete search history.

(56) References Cited

U.S. PATENT DOCUMENTS

2012/0100855 A1    4/2012  Zhang et al.
2014/0056243 A1*   2/2014  Pelletier .............. H04W 76/025
                                              370/329

(Continued)

FOREIGN PATENT DOCUMENTS

CN      104936175 A  *  9/2015  ............ H04W 12/04
RU      2502227 C2      12/2013

(Continued)

OTHER PUBLICATIONS

Checko, A et al. Cloud RAN for Mobile Networks—a Technology Overview, IEEE Communication Surveys & Tutorials, Oct. 31, 2014, pp. 1-24, IEEE.

(Continued)

*Primary Examiner* — Phuongchau Ba Nguyen
(74) *Attorney, Agent, or Firm* — Coats & Bennett, PLLC

(57) ABSTRACT

The disclosure relates to methods for supporting establishment of dual connectivity for a wireless device, performed in a wireless communication network. The wireless device is connected to a first network element via a second network element. The second network element and the wireless device are communicating over a first wireless link. Network functions are split between the first network element and the second network element. The method performed in the wireless device comprises transmitting (2110) a request for a connection to a third network element which is a candidate network element for establishing DC, transmitting (2120) information identifying the first network element to the third network element, and transmitting (2130) an identifier of the wireless device to the third network element, for enabling the establishment of dual connectivity for the wireless device. The disclosure also relates to the methods performed in the network elements, and to the corresponding apparatus.

39 Claims, 20 Drawing Sheets

(56) References Cited

U.S. PATENT DOCUMENTS

| | | | | |
|---|---|---|---|---|
| 2014/0370897 A1* | 12/2014 | Vesterinen | ............ | H04W 36/08 |
| | | | | 455/436 |
| 2015/0045052 A1 | 2/2015 | Pao et al. | | |
| 2015/0264609 A1* | 9/2015 | Zhang | ............... | H04W 36/0055 |
| | | | | 455/436 |
| 2015/0282239 A1* | 10/2015 | Han | .................... | H04W 76/025 |
| | | | | 370/329 |
| 2015/0351135 A1* | 12/2015 | Schmidt | ................ | H04W 76/02 |
| | | | | 455/450 |
| 2015/0351139 A1* | 12/2015 | Zhang | ............... | H04W 52/0251 |
| | | | | 370/329 |
| 2016/0029401 A1* | 1/2016 | Fukuta | .................. | H04W 72/12 |
| | | | | 370/329 |

FOREIGN PATENT DOCUMENTS

| | | | | |
|---|---|---|---|---|
| WO | WO2014/056130 A1 * | 4/2014 | ............ | H04W 36/04 |
| WO | WO2014/056163 A1 * | 4/2014 | ............ | H04W 36/08 |

OTHER PUBLICATIONS

Liu, L, "Analysis of Handover Performance Improvement in Cloud-RAN Architecture", 7th International ICST Conference on Communications and Networking in China, Aug. 8, 2012, pp. 850-855, IEEE.

3rd Generation Partnership Project, "Technical Specification Group Radio Access Network, Study on Small Cell enhancements for E-UTRA and EUTRAN, Higher layer aspects." Technical Specification, 3GPP TR 36.842 V12.0.0 (Dec. 2013), Valbonne, France, pp. 1-71.

* cited by examiner

ESTABLISHMENT OF DUAL CONNECTIVITY

TECHNICAL FIELD

The disclosure generally relates to dual connectivity, and particularly relates to methods and apparatus for supporting establishment of dual connectivity where the wireless device is connected over a first link and initiates the selection of a second link.

BACKGROUND

Evolved Packet System (EPS) is the evolved $3^{rd}$ Generation Partnership Project (3GPP) Packet Switched Domain. EPS includes Evolved Packet Core (EPC), and Evolved Universal Terrestrial Radio Access Network (E-UTRAN). FIG. 1 shows an overview of the EPC architecture in a non-roaming context, which architecture includes a Packet Data Network (PDN) Gateway (PGW), a Serving Gateway (SGW), a Policy and Charging Rules Function (PCRF), a Mobility Management Entity (MME) and a wireless device also called a User Equipment (UE). The radio access, E-UTRAN, consists of one or more eNodeBs (eNB).

FIG. 2 shows the overall E-UTRAN architecture and includes eNBs, providing the E-UTRA user plane and control plane protocol terminations towards the UE. The user plane control terminations comprise Packet Data Convergence Protocol (PDCP), Radio Link Control (RLC), Medium Access Control (MAC), and a Physical Layer (PHY). The control plane control terminations comprise Radio Resource Control (RRC) in addition to the listed user plane control terminations. The eNBs are interconnected with each other by means of an X2 interface. The eNBs are also connected by means of the S1 interface to the EPC, more specifically to the MME by means of the S1-MME interface and to the SGW by means of the S1-U interface.

The main parts of the EPC Control Plane and User Plane architectures are shown in FIG. 3 and FIG. 4, respectively.

Long Term Evolution (LTE) Overview

LTE uses Orthogonal Frequency Division Multiplexing (OFDM) in the Downlink (DL) and Direct Fourier Transform (DFT)-spread OFDM in the Uplink (UL). The basic LTE DL physical resource can thus be seen as a time-frequency grid as illustrated in FIG. 5, where each resource element corresponds to one OFDM subcarrier during one OFDM symbol interval.

In the time domain, LTE DL transmissions are organized into radio frames of 10 ms, each radio frame consisting of ten equally-sized subframes of length $T_{frame}=1$ ms (see FIG. 6). Furthermore, the resource allocation in LTE is typically described in terms of resource blocks (RB), where a RB corresponds to one slot (0.5 ms) in the time domain and 12 contiguous subcarriers in the frequency domain. A pair of two adjacent RBs in time direction (1.0 ms) is known as a RB pair. RBs are numbered in the frequency domain, starting with 0 from one end of the system bandwidth. The notion of virtual RBs (VRB) and physical RBs (PRB), has been introduced in LTE. The actual resource allocation to a UE is made in terms of VRB pairs. There are two types of resource allocations, localized and distributed. In the localized resource allocation, a VRB pair is directly mapped to a PRB pair, hence two consecutive and localized VRB are also placed as consecutive PRBs in the frequency domain. On the other hand, the distributed VRBs are not mapped to consecutive PRBs in the frequency domain; thereby providing frequency diversity for data channel transmitted using these distributed VRBs.

DL transmissions are dynamically scheduled, i.e., in each subframe the base station transmits control information about to which terminals data is transmitted and upon which RBs the data is transmitted in the current DL subframe. This control signaling is typically transmitted in the first 1, 2, 3 or 4 OFDM symbols in each subframe and the number n=1, 2, 3 or 4 is known as the Control Format Indicator (CFI). The DL subframe also contains Common Reference Symbols (CRS) which are known to the receiver and used for coherent demodulation of, e.g., the control information. A DL system with CFI=3 is illustrated in FIG. 7.

LTE Control and User Plane Architecture

Conventional control and user plane protocol architectures highlighting the radio interface on the eNB-side are shown in FIGS. 8a and 8b. The control and user plane consists of the following protocol layers and main functionality:

Radio Resource Control, RRC (control plane only)
  Broadcast of system information for both Non-access stratum (NAS) and Access stratum (AS)
  Paging
  RRC connection handling
  Allocation of temporary identifiers for the UE
  Configuration of signaling radio bearer(s) for RRC connection
  Handling of radio bearers
  QoS management functions
  Security functions including key management
  Mobility functions including:
    UE measurement reporting and control of the reporting
    Handover
    UE cell selection and reselection and control of cell selection and reselection
  NAS direct message transfer to/from the UE
Packet Data Convergence Protocol, PDCP
  There exists one PDCP entity for each radio bearer for the UE. PDCP is used for both control plane (RRC) and for user plane
  Control plane main functions, including ciphering/deciphering and integrity protection
  User Plane main functions, including ciphering/deciphering, header compression and decompression using Robust Header Compression (ROHC), and in-sequence delivery, duplicate detection and retransmission (mainly used during handover)
Radio Link Control, RLC
  The RLC layer provides services for the PDCP layer and there exists one RLC entity for each radio bearer for the UE
  Main functions for both control and user plane include segmentation or concatenation, retransmission handling (using Automatic Repeat Request (ARQ), duplicate detection and in-sequence delivery to higher layers.
Medium Access Control, MAC
  The MAC provides services to the RLC layer in the form of logical channels, and performs mapping between these logical channels and transport channels
  Main functions are: UL and DL scheduling, scheduling information reporting, hybrid-ARQ retransmissions and multiplexing/demultiplexing data across multiple component carriers for carrier aggregation Physical Layer, PHY The PHY provides services to the MAC layer in the form of transport channels and handles mapping of transport channels to physical channels.

Main functions for DL performed by the eNB (OFDM) are:

Sending of DL reference signals

Detailed steps (from "top to down"): CRC insertion; code block segmentation and per-code-block CRC insertion; channel coding (Turbo coding); rate matching and physical-layer hybrid-ARQ processing; bit-level scrambling; data modulation (QPSK, 16QAM, or 64QAM); antenna mapping and multi-antenna processing; OFDM processing, including Inverse Fast Fourier Transform (IFFT), and Cyclic Prefix (CP) insertion resulting in time domain data sometimes referred to as IQ data or digitalized Radio Frequency (RF) data); digital-to-analog conversion; power amplifier; and sending to antenna.

Main functions for UL performed by the eNB (DFT-spread OFDM) are:

Random access support

Detailed steps (from "top to down"): CRC removal, code block desegmentation, channel decoding, rate matching and physical-layer hybrid-ARQ processing; bit-level descrambling; data demodulation; Inverse Discrete Fourier Transform (IDFT); antenna mapping and multi-antenna processing; OFDM processing, including Fast Fourier Transform (FFT) and CP removal; Analog-to-Digital conversion; power amplifier; and receiving from antenna.

The described eNB functionality can be deployed in different ways. In one example, all the protocol layers and related functionality are deployed in the same physical node, including the antenna. One example of this is a pico or femto eNodeB. Another deployment example is a so called Main-Remote split. In this case, the eNodeB is divided into a Main Unit and a Remote Unit that are also called Digital Unit (DU) and Remote Radio Unit (RRU) respectively. The Main Unit or DU contains all the protocol layers, except the lower parts of the PHY layer that are instead placed in the Remote Unit or RRU. The split in the PHY-layer is at the time domain data level (IQ data, i.e. after/before IFFT/FFT and CP insertion/removal). The IQ data is forwarded from the Main Unit to the Remote Unit over a so called Common Public Radio Interface (CPRI) which is a high speed, low latency data interface. The Remote Unit then performs the needed Digital-to-Analog conversion to create analog RF-data, power amplifies the analog RF-data and forwards the analog RF data to the antenna. In still another deployment option, the RRU and the antenna are co-located, creating a so called Antenna Integrated Radio (AIR).

Carrier Aggregation

The LTE Rel-10 specifications have been standardized, supporting Component Carrier (CC) bandwidths up to 20 MHz, which is the maximal LTE Rel-8 carrier bandwidth. An LTE Rel-10 operation wider than 20 MHz is possible and appears as a number of LTE CCs to an LTE Rel-10 terminal. The straightforward way to obtain bandwidths wider than 20 MHz is by means of Carrier Aggregation (CA). CA implies that an LTE Rel-10 terminal can receive multiple CCs, where the CCs have or at least have the possibility to have, the same structure as a Rel-8 carrier. CA is illustrated in FIG. 9. The Rel-10 standard support up to five aggregated CCs, where each CC is limited in the RF specifications to have one of six bandwidths, namely 6, 15, 25, 50, 75 or 100 RB corresponding to 1.4, 3, 5, 10, 15, and 20 MHz respectively.

The number of aggregated CCs as well as the bandwidth of the individual CCs may be different for UL and DL. A symmetric configuration refers to the case where the number of CCs in DL and UL is the same whereas an asymmetric configuration refers to the case that the number of CCs is different in DL and UL. It is important to note that the number of CCs configured in the network may be different from the number of CCs seen by a terminal. A terminal may for example support more DL CCs than UL CCs, even though the network offers the same number of UL and DL CCs.

CCs are also referred to as cells or serving cells. More specifically, in an LTE network, the cells aggregated by a terminal are denoted primary Serving Cell (PCell), and secondary Serving Cell (SCell). The term serving cell comprises both PCell and one or more SCells. All UEs have one PCell. Which cell is a UE's PCell is terminal specific and is considered "more important", i.e., vital control signaling and other important signaling is typically handled via the PCell. UL control signaling is always sent on a UE's PCell. The component carrier configured as the PCell is the primary CC whereas all other CCs are SCells. The UE can send and receive data both on the PCell and SCells. For control signaling such as scheduling commands this could either be configured to only be transmitted and received on the PCell. However, the commands are also valid for SCell, and the commands can be configured to be transmitted and received on both PCell and SCells. Regardless of the mode of operation, the UE will only need to read the broadcast channel in order to acquire system information parameters on the Primary Component Carrier (PCC). System information related to the Secondary Component Carrier(s) (SCC), may be provided to the UE in dedicated RRC messages. During initial access, an LTE Rel-10 terminal behaves similar to a LTE Rel-8 terminal. However, upon successful connection to the network, a Rel-10 terminal may—depending on its own capabilities and the network—be configured with additional serving cells in the UL and DL. Configuration is based on RRC. Due to the heavy signaling and rather slow speed of RRC signaling, it is envisioned that a terminal may be configured with multiple serving cells even though not all of them are currently used. In summary, LTE CA supports efficient use of multiple carriers, allowing data to be sent and received over all carriers. Cross-carrier scheduling is supported, avoiding the need for the UE to listen to all carrier-scheduling channels all the time. A solution relies on tight time synchronization between the carriers.

LTE Re/42 Dual Connectivity

Dual connectivity (DC) is a solution currently being standardized by 3GPP to support UEs connecting to multiple carriers to send and receive data on multiple carriers at the same time. The following is an overview description of DC based on the 3GPP standard. E-UTRAN supports DC operation, whereby a UE with multiple receivers and transmitters, which is in RRC_CONNECTED mode, is configured to utilize radio resources provided by two distinct schedulers, located in two eNBs interconnected via a non-ideal backhaul over the X2. eNBs involved in DC for a certain UE may assume two different roles. An eNB may either act as a Master eNB (MeNB), or as a Secondary eNB (SeNB). In DC, a UE is connected to one MeNB and one SeNB. The radio protocol architecture that a particular bearer uses depends on how the bearer is setup. Three alternatives exist: Master Cell Group (MCG) bearer, Secondary Cell Group (SCG) bearer, and split bearer. Those three alternatives are depicted in FIG. 10. Signal Radio Bearers (SRBs) are always of the MCG bearer and therefore only use the radio resources provided by the MeNB. Note that DC can also be described as having at least one bearer configured to use radio resources provided by the SeNB.

Inter-eNB control plane signaling for DC is performed by means of X2 interface signaling. Control plane signaling towards the MME is performed by means of S1 interface signaling. There is only one S1-MME connection per UE between the MeNB and the MME. Each eNB should be able to handle UEs independently, i.e. provide the PCell to some UEs while providing SCell(s) for SCG to others. Each eNB involved in DC for a certain UE owns its radio resources and is primarily responsible for allocating radio resources of its cells. Coordination between MeNB and SeNB is performed by means of X2 interface signaling. FIG. 11 shows Control Plane (C-plane) connectivity of eNBs involved in DC for a certain UE. The MeNB is C-plane connected to the MME via S1-MME, the MeNB and the SeNB are interconnected via X2-C. FIG. 12 shows User Plane (U-plane) connectivity of eNBs involved in DC for a certain UE. U-plane connectivity depends on the bearer option configured. For MCG bearers, the MeNB is U-plane connected to the S-GW via S1-U, and the SeNB is not involved in the transport of user plane data. For split bearers, the MeNB is U-plane connected to the S-GW via S1-U and in addition, the MeNB and the SeNB are interconnected via X2-U. For SCG bearers, the SeNB is directly connected with the S-GW via S1-U.

Centralization of Radio Access Network (E-UTRAN) functionality

Possible future evolution of the current Radio Access Network (RAN) architecture has been discussed. From a starting point in a macro site based topology, introduction of low power cells, an evolution of the transport network between different radio base station sites, a radio base station hardware evolution, and an increased need for processing power to give some examples, have given rise to new challenges and opportunities. Several strategies are proposed for the RAN architecture, pulling in sometimes different directions. Some strategies, like the gains of coordination, hardware pooling gains, energy saving gains and the evolution of the backhaul/fronthaul network, are working in favor of a more centralized deployment. At the same time, other strategies are working towards decentralization, such as very low latency requirements for some 5G use cases, e.g., mission critical Machine Type Communication (MTC) applications. The terms fronthaul and backhaul are used in relation to the base station. The traditional definition for fronthaul is the CPRI based fiber link between the baseband Main Unit and the Remote Unit. The backhaul refers to the transport network used for S1/X2-interfaces.

The recent evolution in backhaul/fronthaul technologies has indeed opened up the possibility to centralize the baseband, often referred to as C-RAN. C-RAN is a term that can be interpreted in different ways. For some it means a "baseband hotel" like solutions in which the basebands from many sites are collocated to a central site, although there is no tight connection and fast exchange of data between the baseband units. The most common interpretation of C-RAN is maybe "Centralized RAN" where there is at least some kind of coordination between the basebands. A potentially attractive solution is the smaller centralized RAN that is based on a macro base station and the lower power nodes covered by it. In such a configuration, a tight coordination between the macro and the low power nodes can often give considerable gains. The term "Coordinated RAN" is an often used interpretation of C-RAN that focuses on the coordination gains of the centralization. Other more futuristic interpretations of C-RAN include "cloud" based and "virtualized" RAN solutions where the radio network functionality is supported on generic hardware such as general purpose processors, and possibly as virtual machines.

A centralized deployment can be driven by one or several forces like, e.g., a possible ease of maintenance, upgrade and less need for sites, as well as harvesting of coordination gains. A common misconception is that there is a large pooling gain and a corresponding hardware saving to be done by the centralization. The pooling gain is large over the first number of pooled cells but then diminishes quickly. One key advantage of having the basebands from a larger number of sites co-located and interconnected is the tight coordination that it allows. Examples of these are UL Coordinated Multi-Point (CoMP), and a combining of several sectors and/or carriers into one cell. The gains of these features can sometimes be significant in relation to the gains of looser coordination schemes such as, e.g., enhanced inter-cell interference coordination (eICIC) that can be done over standard interfaces (X2) without co-location of the baseband.

An attractive C-RAN deployment from a coordination gain perspective is the C-RAN built around a larger macro site, normally with several frequency bands, and a number of lower power radios, covered by the macro site, that are tightly integrated into the macro over high-speed interconnect. The largest gains are expected to be seen in deployment scenarios such as for stadiums and malls. An important consideration for any C-RAN deployment is the transport over the fronthaul, i.e., the connection between the centralized baseband part and the radios, sometimes referred to as "the first mile". The cost of the fronthaul, which vary rather greatly between markets, needs to be balanced against the benefits.

SUMMARY

Problems

Ongoing discussions in the wireless industry in different fora seem to move towards a direction where the functional architecture of the 5G radio access network should be designed flexibly enough to be deployed in different hardware platforms and possibly in different sites in the network. A functional split as illustrated in FIG. 13 has been proposed. In this example, the RAN functions are classified in synchronous functions (SF) and asynchronous functions (AF). Asynchronous functions are functions with loose timing constraints, and synchronous functions are typically executing time critical functionality. The synchronous network functions have requirements on processing timing which are strictly dependent on timing of a radio link used for communicating with the wireless device. The asynchronous network functions have requirements on processing timing not strictly dependent on the timing of the radio link, or even independent on the timing of the radio link. The synchronous functions may be placed in a logical node called eNB-s and the asynchronous functions may be placed in a logical node called eNB-a. The instances of functions associated to the eNB-s, i.e. the synchronous functions, are placed at a network element close to the air interface. The synchronous functions will form what is called a synchronous function group (SFG). The instances of the asynchronous functions associated to the eNB-a can be flexibly instantiated either at the network element close to the air interface, i.e. at the same network element as the eNB-s or in other network elements such as fixed network nodes (FNNs). If it is assumed that the functions are E-UTRAN functions, the split of functions may lead to the functional architecture for the control plane and the user plane illustrated in FIGS. 14a and 14b, where one new interface will be needed.

In order to support DC or multi-connectivity features, such as user plane aggregation for aggregated data rates, or control/user plane diversity for e.g. reliability and fast packet switching, instances of asynchronous functions can be made common to multiple instances of synchronous functions. In other words, a same instance associated to a functions of an eNB-a can control multiple instances associated to an eNB-s function. In the case of the current LTE functionality (see section "LTE control and user plane architecture" above), this may lead to common instances for RRC and PDCP functions associated to N multiple instances of RLC/MAC/PHY. N is the number of nodes that the UE can be connected to at the same time. One example scenario is illustrated In FIG. 15 where the UE is connected via both network element eNB-s1 and network element eNB-s2 to network element eNB-a. The network element eNB-a contains in general the asynchronous functions, i.e. the protocols that are common for both control plane (RRC and PDCP) and user plane (PDCP).

It is envisioned that 5G radio accesses will be composed by multiple air interfaces, e.g. air interface variants or air interfaces for different RATs. These multiple air interfaces may be tightly integrated, meaning that it is possible to have common function instances for multiple air interfaces. It is also envisioned that one of the air interfaces in a 5G scenario may be LTE-compatible, e.g. an evolution of LTE, while another one is non-LTE compatible. Therefore, in order to address such a multi-RAT integrated architecture, the multi-connection scenario must support network elements from different access technologies. The non-LTE-compatible network elements are likely to support different lower layer protocols than LTE-compatible ones support, e.g. due to the high frequencies a 5G network is supposed to operate and the new use cases it is required to address. Therefore standardized CA between LTE and the new 5G radio accesses may not be possible. The standardized DC solution contains different levels of user plane aggregation but no means for Dual Control Plane between two different LTE-carriers or between LTE-compatible and non-LTE-compatible carriers.

Therefore, the previously described functional split between eNB-a and eNB-s can be extended so that the same instance of asynchronous functions are defined for multiple air interfaces, where the UE can be connected to the multiple air interfaces at the same time or during mobility procedures. The multiple air interfaces will then have different synchronous functional groups per air interface, e.g. for compatible-LTE and non-compatible LTE parts of the 5G radio access.

The split illustrated in FIG. 13 may be applied to DC between different RATs, e.g. one LTE RAT and one 5G RAT. In this case the eNB-a can contain common support for both control and user plane for the asynchronous functions. An eNB-s for each RAT contains the synchronous functions, thus enabling that the synchronous functions are RAT-specific, e.g. different for LTE RAT and 5G RAT. Such a scenario is shown in FIG. 16 where the eNB-a is called "5G & LTE eNB-a" and the eNB-s are called "LTE eNB-s1" and "5G eNB-s2" respectively.

The functional split and RAN architecture such as the one described above with reference to FIGS. 15 and 16, or any other RAN functional split where groups of functions are instantiated in different network elements, implies a possibility to have common function instance(s) associated to multiple network elements and/or links from the same or multiple air interfaces. However, there is no known procedure to establish DC for a wireless device in such a RAN architecture, when it is the wireless device that initiates the selection of the second link for the DC. For example, in the example scenario in FIG. 15, when a wireless device connected via eNB-s1 to eNB-a over a first link wants to establish a dual connection to eNB-s2 over a second link, the instances of the eNB-a of this wireless device must be located in order to establish an association between the eNB-s2 and eNB-a. The association is needed e.g. to enable the eNB-s2 to download UE-specific information.

An object may be to alleviate or at least reduce one or more of the above mentioned problems. This object and others are achieved by the methods, the wireless device, and the network elements according to the independent claims, and by the embodiments according to the dependent claims.

According to a first aspect, a method for supporting establishment of dual connectivity for a wireless device is provided. The wireless device is connected to a first network element via a second network element of a wireless communication network. The second network element and the wireless device are communicating over a first wireless link. Network functions serving the wireless device are split between the first network element and the second network element. The method is performed in the wireless device and comprises transmitting a request for a connection to a third network element which is a candidate network element for establishing dual connectivity. The request is transmitted to the third network element over a second wireless link. The method also comprises transmitting information identifying the first network element to the third network element, such that the third network element can establish connectivity to the first network element. The method further comprises transmitting an identifier of the wireless device to the third network element, for enabling the establishment of dual connectivity for the wireless device.

According to a second aspect, a method for supporting establishment of dual connectivity for a wireless device is provided. The wireless device is connected to a first network element via a second network element of a wireless communication network, the second network element and the wireless device communicating over a first wireless link. Network functions serving the wireless device are split between the first network element and the second network element The method is performed in a third network element being a candidate network element for the establishment of dual connectivity for the wireless device. The method comprises receiving a request for a connection to the third network element. The request is received from the wireless device over a second wireless link. The method also comprises receiving information identifying the first network element and an identifier of the wireless device from the wireless device, and establishing connectivity to the first network element using the information identifying the first network element. The method further comprises sending an indication to the first network element that the wireless device has connected to the third network element, the indication comprising the identifier of the wireless device.

According to a third aspect, a method for supporting establishment of dual connectivity for a wireless device is provided. The wireless device is connected to a first network element via a second network element of a wireless communication network. The second network element and the wireless device are communicating over a first wireless link. Network functions serving the wireless device are split between the first network element and the second network element. A third network element is a candidate network element for the establishment of dual connectivity for the wireless device. The third network element and the wireless device are communicating over a second wireless link. The method is performed in the first network element, and comprises establishing connectivity to the third network element upon request from the third network element. The method also comprises receiving an indication from the third network element that the wireless device has connected to the third network element, the indication comprising the identifier of the wireless device. The method further comprises determining to establish dual connectivity for the wireless device over the first and second links, and retrieving information related to a context of the wireless device using the identifier of the wireless device. The method also comprises transmitting the information related to the context to the third network element.

According to a fourth aspect, a wireless device configured to support establishment of dual connectivity for the wireless device is provided. The wireless device is connected to a first network element via a second network element of a wireless communication network. The second network element and the wireless device are communicating over a first wireless link. Network functions serving the wireless device are split between the first network element and the second network element. The wireless device is further configured to transmit a request for a connection to a third network element being a candidate network element for establishing dual connectivity. The request is transmitted to the third network element over a second wireless link. The wireless device is also configured to transmit information identifying the first network element to the third network element, such that the third network element can establish connectivity to the first network element. The wireless device is further configured to transmit an identifier of the wireless device to the third network element, for enabling the establishment of dual connectivity for the wireless device.

According to a fifth aspect, a third network element being a candidate network element for the establishment of dual connectivity for a wireless device. The third network element is configured to support the establishment of the dual connectivity. The wireless device is connectable to a first network element via a second network element of a wireless communication network. The second network element and the wireless device are communicating over a first wireless link. Network functions serving the wireless device are split between the first network element and the second network element. The third network element is configured to receive a request for a connection to the third network element, the request being received from the wireless device over a second wireless link. The third network element is also configured to receive information identifying the first network element and an identifier of the wireless device from the wireless device. The third network element is further configured to establish connectivity to the first network element using the information identifying the first network element, and send an indication to the first network element that the wireless device has connected to the third network element, the indication comprising the identifier of the wireless device.

According to a sixth aspect, a first network element is configured to support establishment of dual connectivity for a wireless device. The wireless device is connectable to the first network element via a second network element of a wireless communication network. The second network element and the wireless device are communicating over a first wireless link. Network functions serving the wireless device are split between the first network element and the second network element. A third network element is a candidate network element for the establishment of dual connectivity for the wireless device. The third network element and the wireless device are communicating over a second wireless link. The first network element is configured to establish connectivity to the third network element upon request from the third network element, and receive an indication from the third network element that the wireless device has connected to the third network element, the indication comprising the identifier of the wireless device. The first network element is further configured to determine to establish dual connectivity for the wireless device over the first and second links, and retrieve information related to a context of the wireless device using the identifier of the wireless device. The first network element is also configured to transmit the information related to the context to the third network element.

According to further aspects, the object is achieved by computer programs and computer program products corresponding to the aspects above.

One advantage of embodiments is that establishment of DC for a wireless device where it is the wireless device that initiates the selection of the second link is enabled in a RAN function architecture where the RAN functions providing the communication service to the wireless device are split in two. As the RAN functions are split they may be distributed in different physical network elements.

Other objects, advantages and features of embodiments will be explained in the following detailed description when considered in conjunction with the accompanying drawings and claims.

BRIEF DESCRIPTION OF THE DRAWINGS

The various aspects of embodiments disclosed herein, including particular features and advantages thereof, will be readily understood from the following detailed description and the accompanying drawings.

DETAILED DESCRIPTION

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Figure 1:
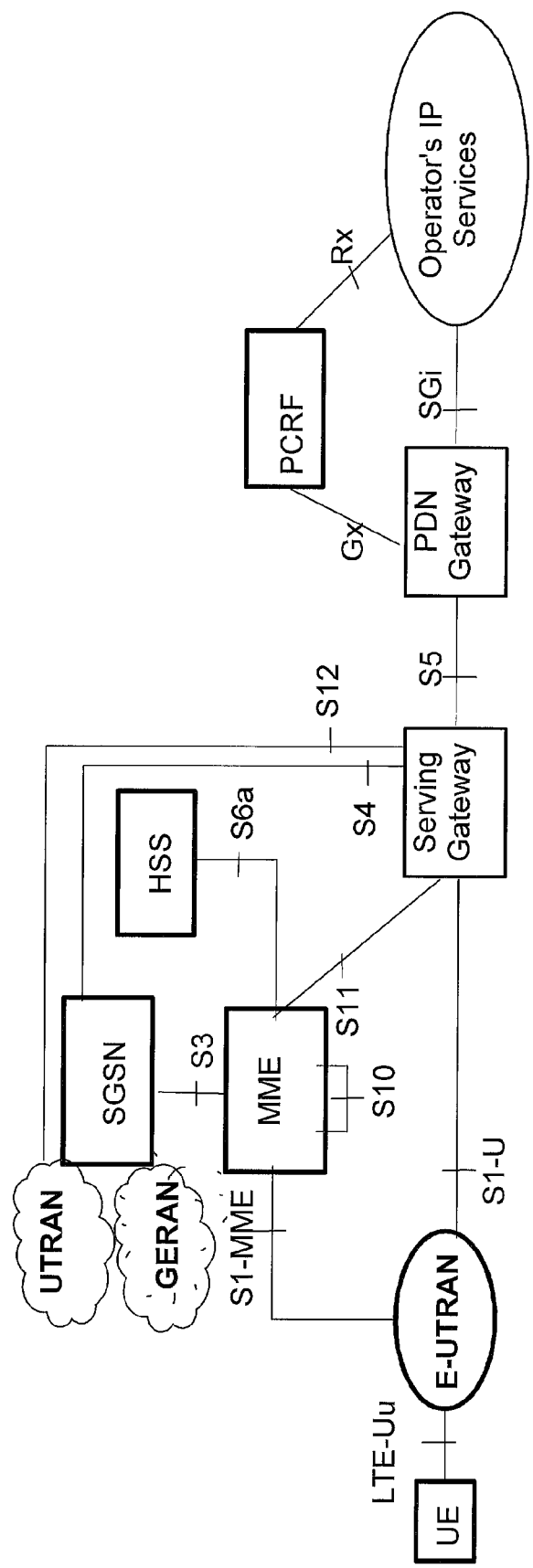
FIG. 1 is a block diagram schematically illustrating a non-roaming EPC architecture for 3GPP accesses.
Figure 2:
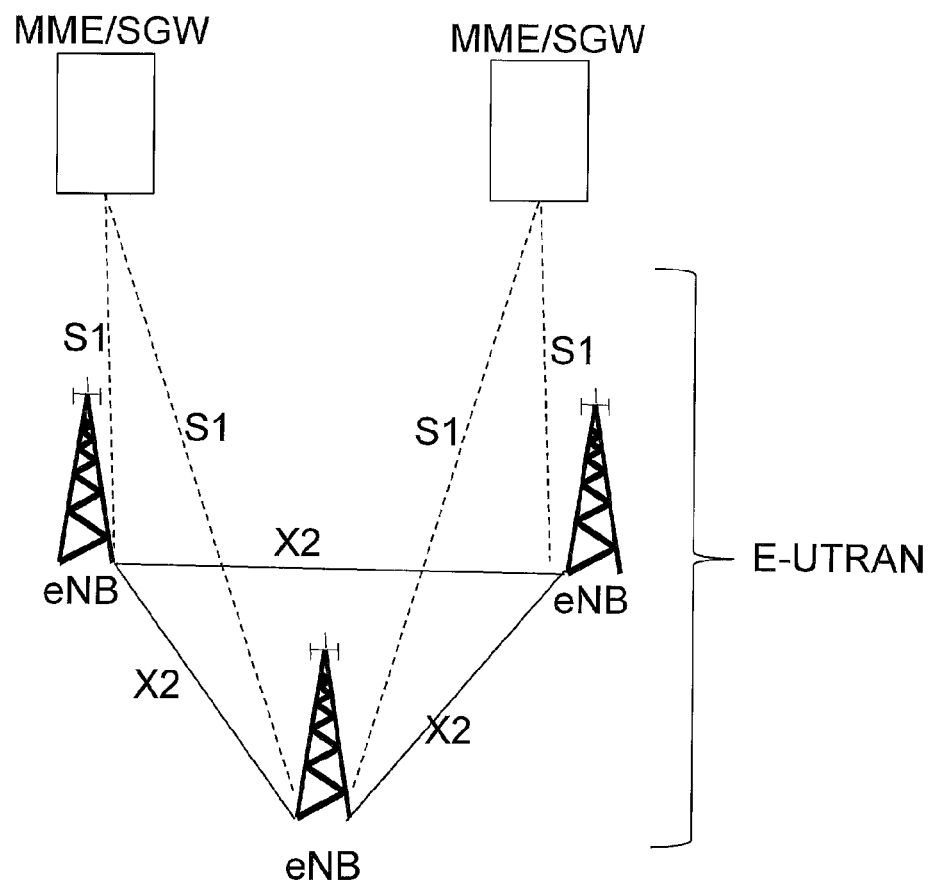
FIG. 2 is a block diagram schematically illustrating an E-UTRAN overall architecture.
Figure 9:
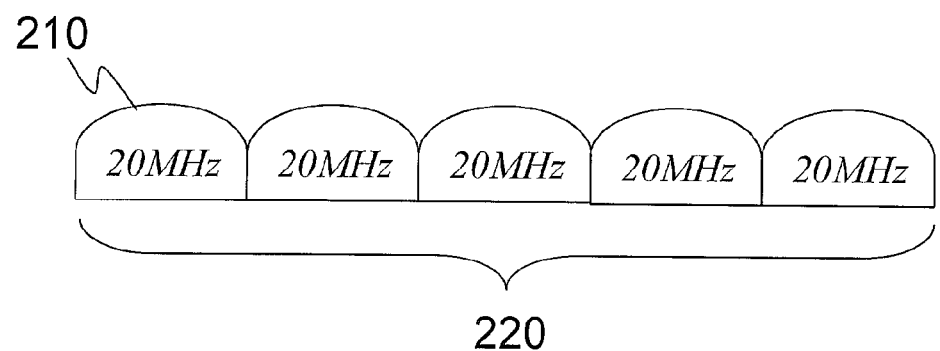
FIG. 9 schematically illustrates CA of five CC.
Figure 3:
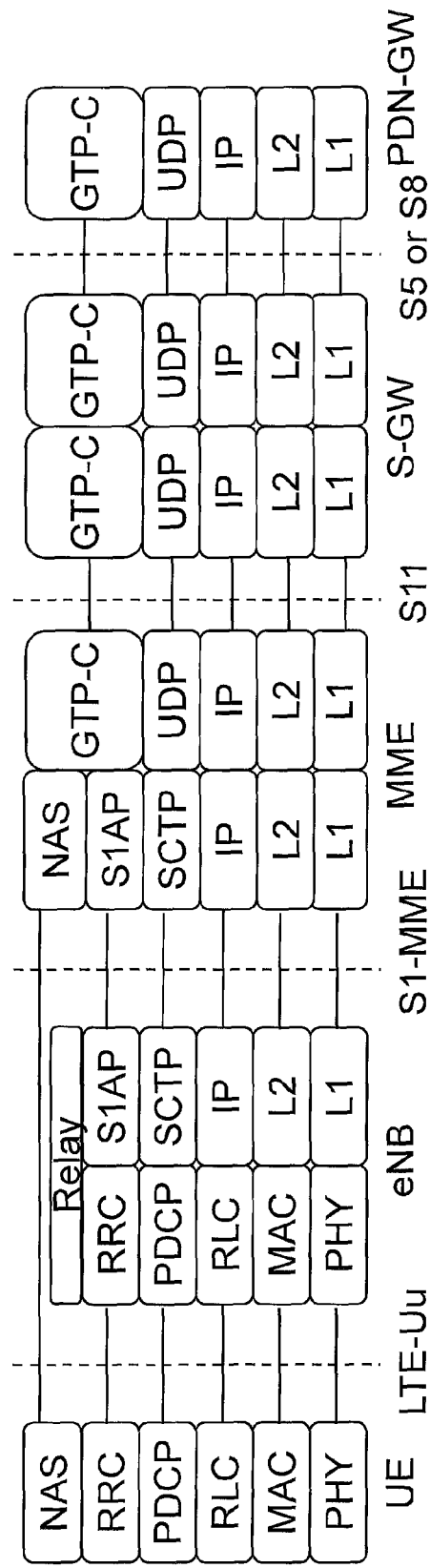
FIG. 3 schematically illustrates an EPC Control Plane protocol architecture.
Figure 4:
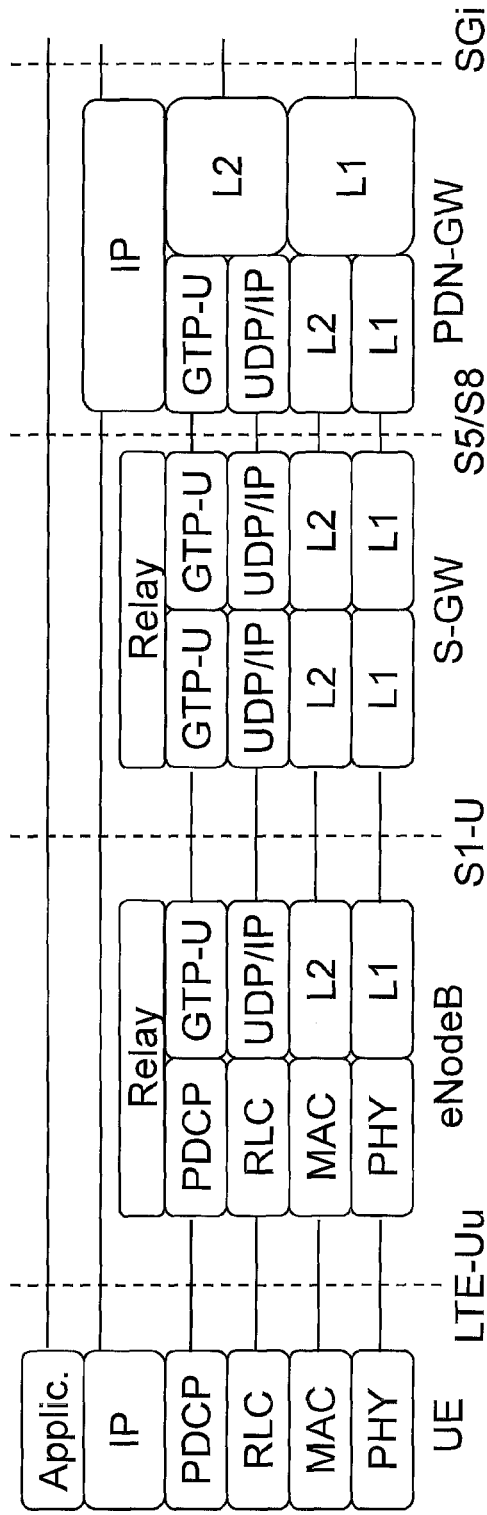
FIG. 4 schematically illustrates an EPC User Plane protocol architecture.
Figure 5:
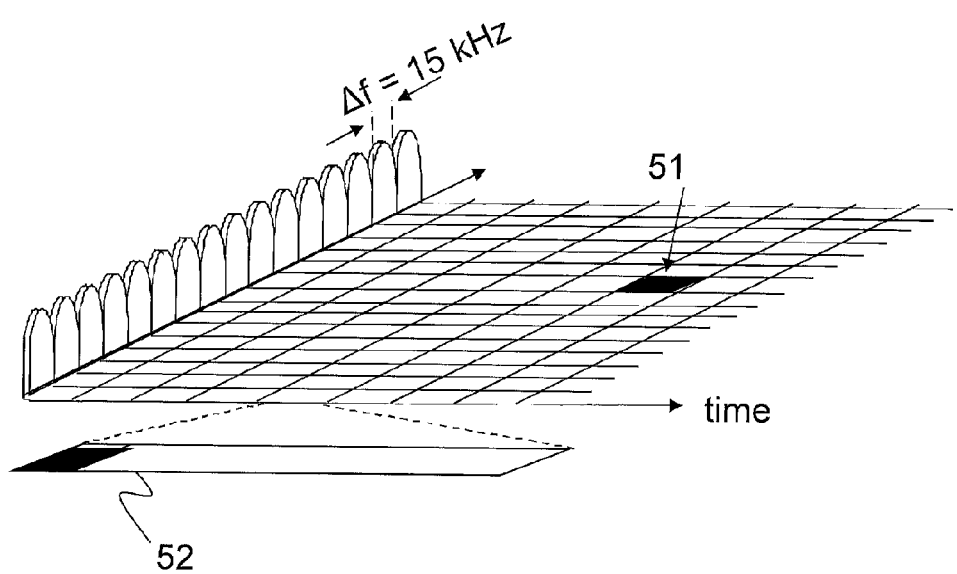
FIG. 5 schematically illustrates the basic LTE DL physical resource.
Figure 6:
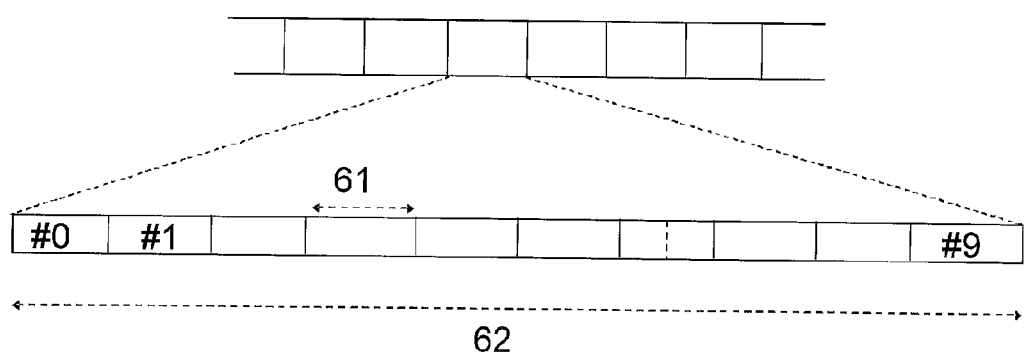
FIG. 6 schematically illustrates an LTE time-domain structure.
Figure 7:
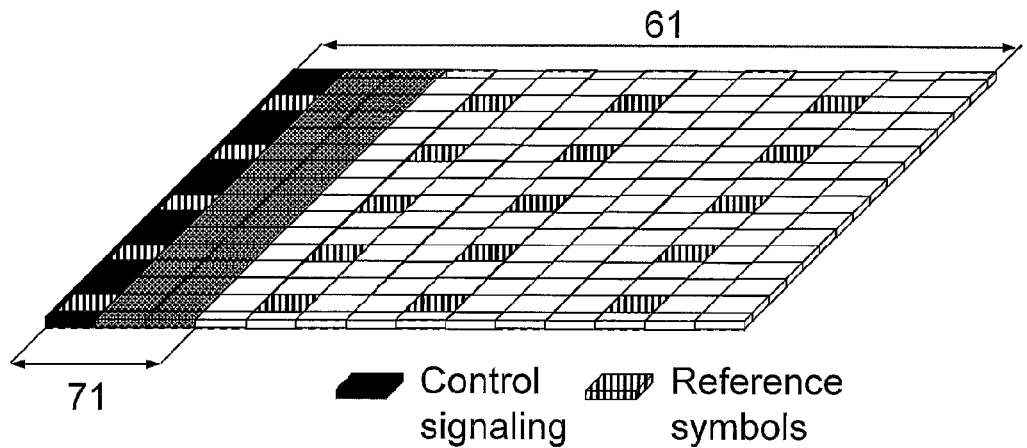
FIG. 7 schematically illustrates a DL subframe.
Figure 8A:
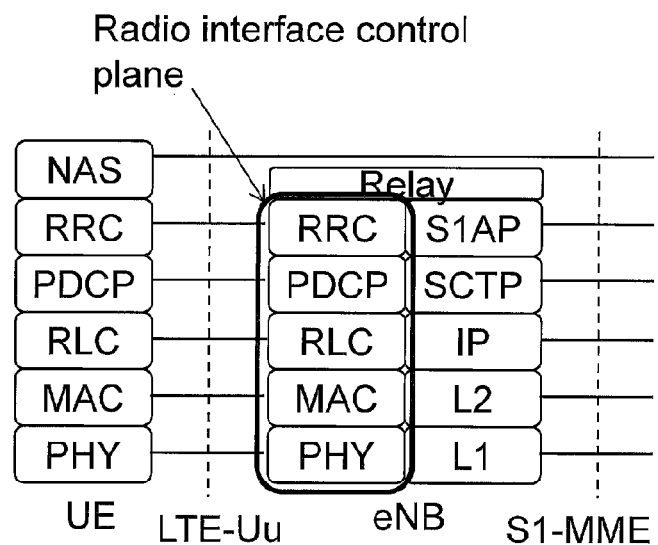
FIGS. 8*a* and 8*b* schematically illustrate control and user plane protocol layers for a conventional eNB radio interface.
Figure 8B:
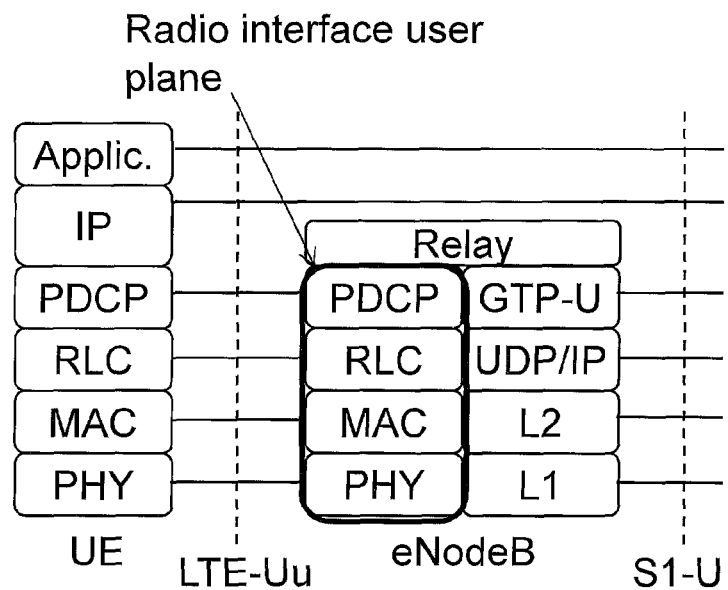
Figure 11:
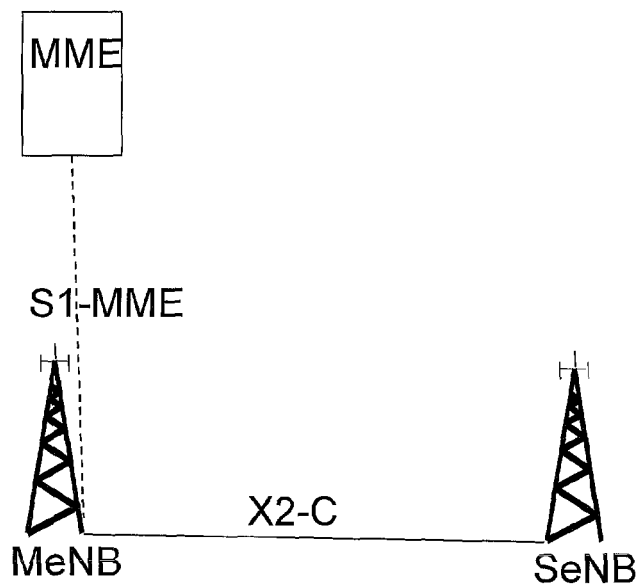
FIG. 11 is a block diagram schematically illustrating C-Plane connectivity of eNBs involved in DC.
Figure 10:
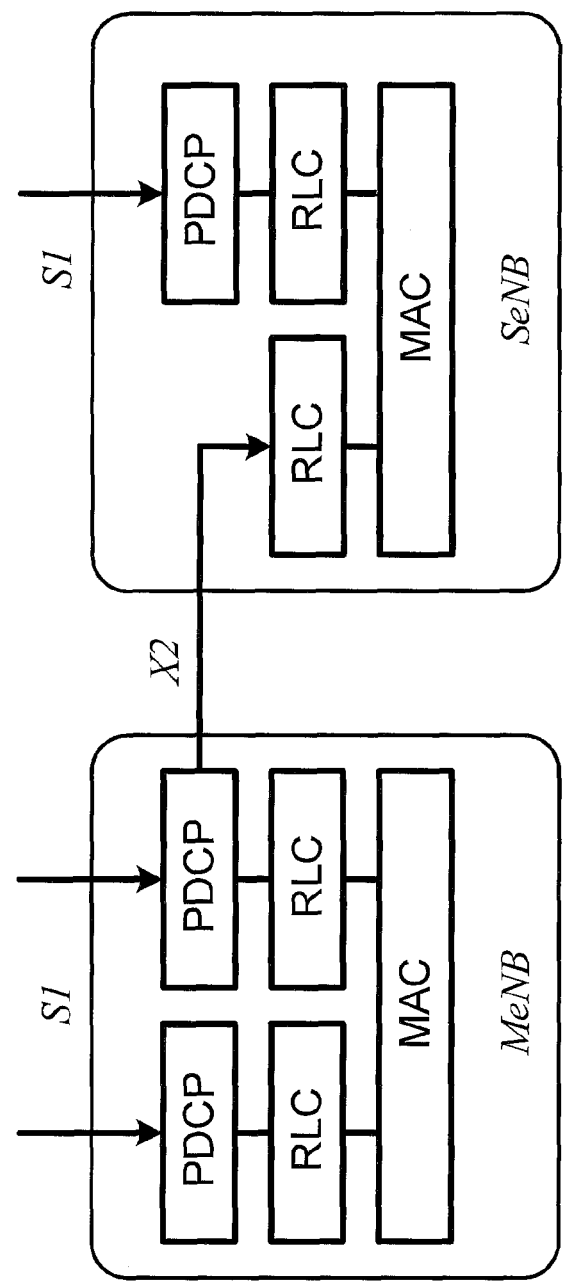
FIG. 10 schematically illustrates a Radio Protocol Architecture for DC.
Figure 12:
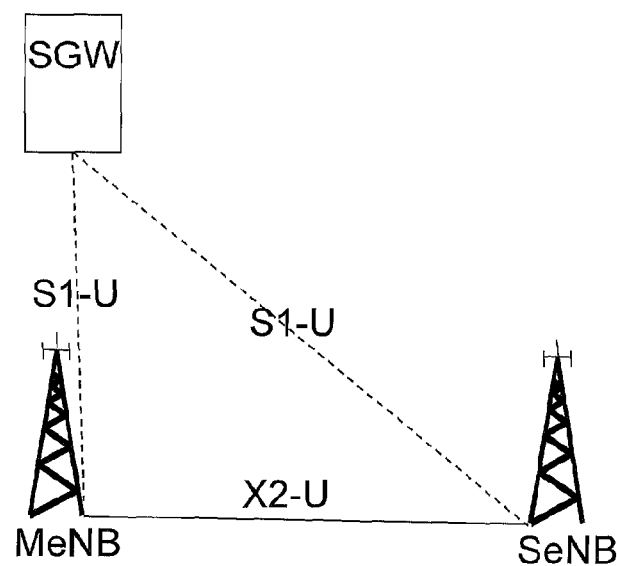
FIG. 12 is a block diagram schematically illustrating U-Plane connectivity of eNBs involved in DC.
Figure 13:
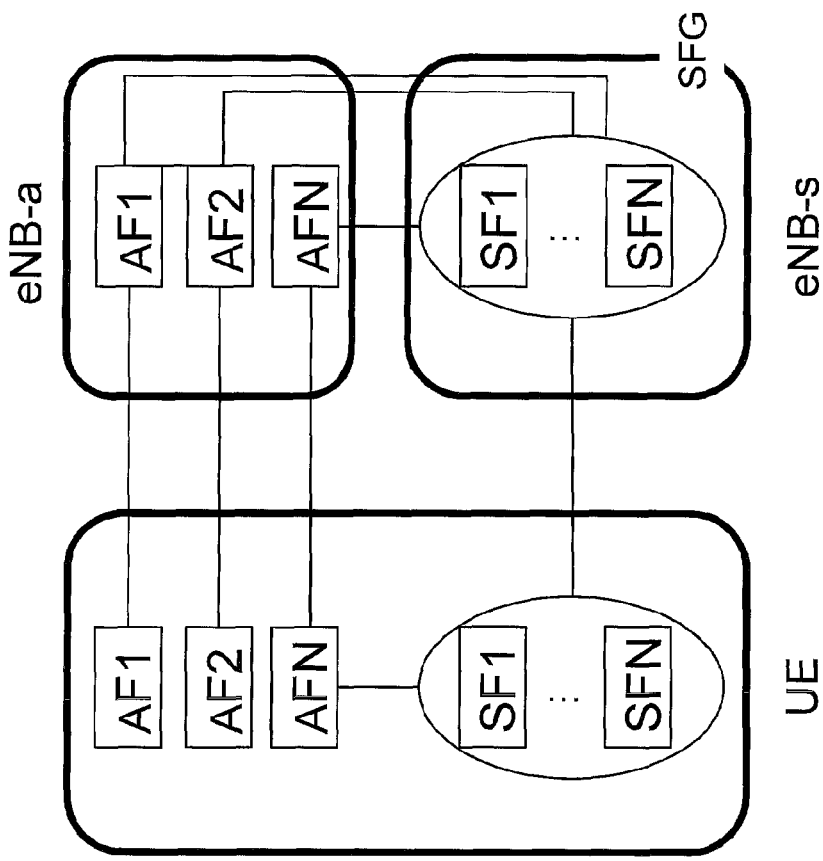
FIG. 13 schematically illustrates one example of a functional split between network elements.
Figure 14A:
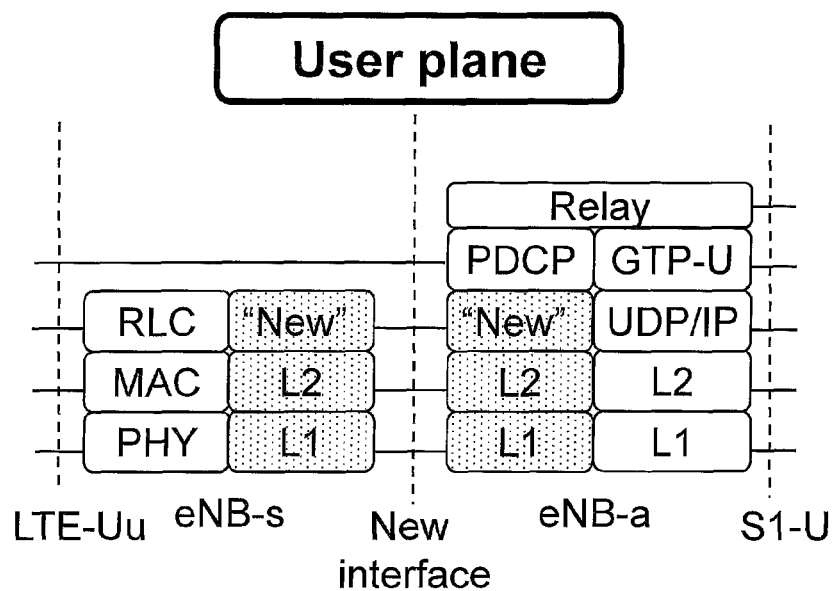
FIGS. 14*a* and 14*b* schematically illustrate an eNB split into eNB-a and eNB-s.
Figure 14B:
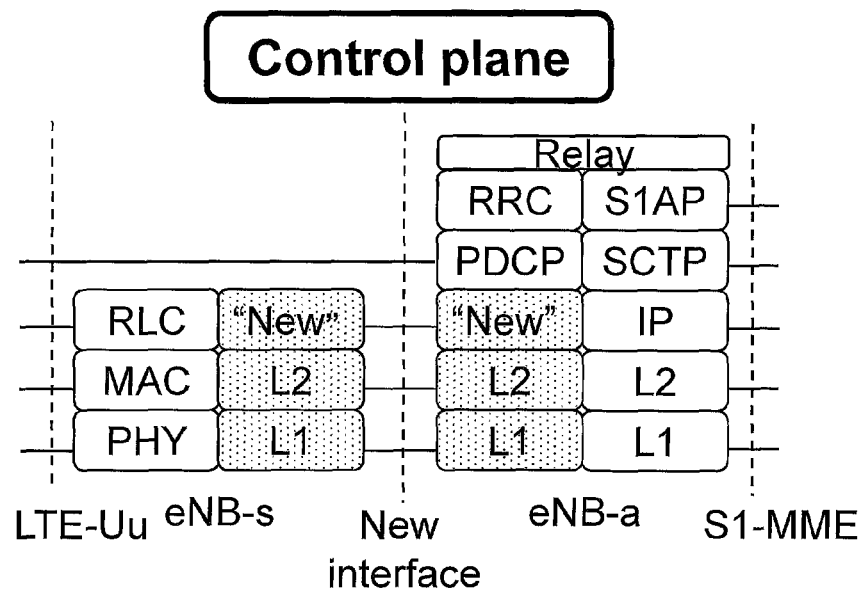
Figure 15:
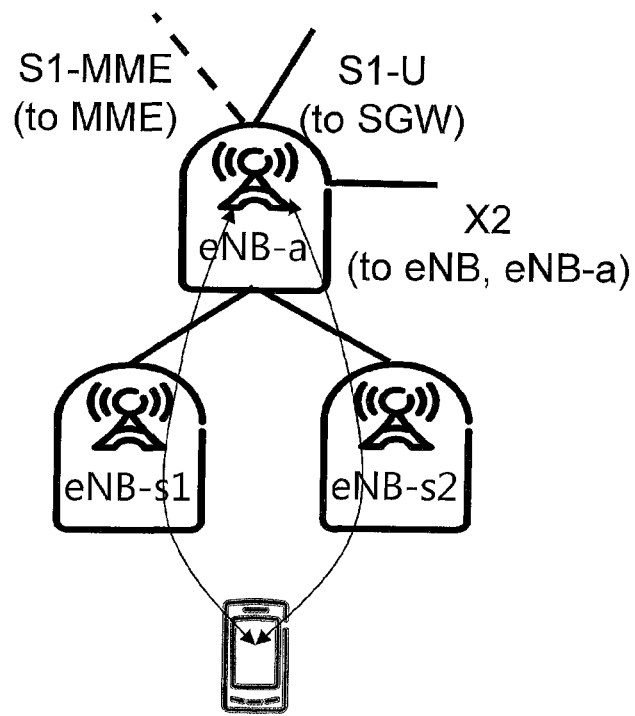
FIG. 15 schematically illustrates DC established for a wireless device.
Figure 16:
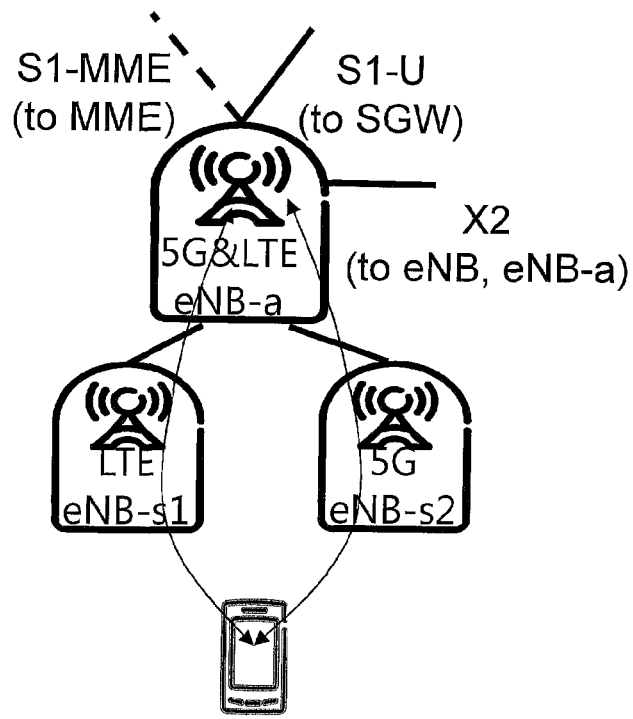
FIG. 16 schematically illustrates a Multi-RAT DC established for a wireless device.

Embodiments are described in a non-limiting general context in relation to the establishment of DC for a UE in the example scenario illustrated in FIG. 15, where the network functions are split between eNB-a and eNB-s1/e-NB-s2 based on whether they are asynchronous or synchronous. The same instance of asynchronous functions eNB-a may be defined for multiple air interfaces, where the UE can be connected to the multiple air interfaces at the same time. The multiple air interfaces will then have different synchronous function groups per air interface. eNB-s1 and eNB-s2 in FIG. 15 may be from the same RAT, and may be owned by the same operator or by different operators. Alternatively, eNB-s1 and eNB-s2 may be from different RATs, e.g. LTE-compatible and non-LTE-compatible 5G accesses. Also in this second case they may be owned by the same operator or by different operators. The embodiments described herein are mainly given in the context of multiple RATs, for example LTE and 5G RATs. However, the described embodiments may also apply for single RAT cases, especially in the cases when a single eNB-s is connected to multiple different operator networks, as in these cases a single RAT may be used in both first and second accesses.

Although the functions in this example scenario are differentiated based on whether they are synchronous or not, it should be noted that embodiments of the invention may be applied to any other network function architecture where the network functions are split into two logical network nodes based on some other criteria than whether the function is synchronous or not. One example is to split functions in a multi-RAT scenario based on whether they are common for the multiple RATs or specific to one of the RATs.

Although embodiments are described in relation to a DC case, the embodiments may also be applied to a scenario where the UE enters multi-connectivity, where "multi" implies more than dual/two, by adding yet another link that can be from the same or from a different access layer or RAT than the other links. The procedure for adding such further link for multi-connectivity is similar to the addition of the second link when the UE enters DC, and embodiments of the invention may thus easily be applicable to the multi-connectivity scenario.

The problem of non-existing procedures for establishing DC for a wireless device in the example scenario illustrated in FIG. 15, when it is the UE that initiates the selection of the second link for the DC, is addressed by a solution enabling the location of the existing instance of an asynchronous function currently serving the UE via a first link.

Different solutions are described based on how the second link is connected to the cellular operator network in which the existing asynchronous function (or group of functions) currently serving the UE resides. These solutions vary depending on if the base station providing the second link has an existing secure connection to the cellular operator network or if such a secure connection needs to be dynamically established.

In embodiments of the invention, the UE performs a method for supporting the establishment of DC. The UE is connected to a first network element eNB-a via a second network element eNB-s1, and the first network element eNB-a therefore holds a UE context for the UE. The UE communicates with the second network element eNB-S1 over a first link. Based on a trigger, the UE initiates a procedure to connect to a third network element eNB-s2 over a second link, while still maintaining the connection to the second network element over the first link. The procedure to connect to the third network element eNB-s2 comprises transmitting one or more messages to the eNB-s2 over the second link identifying the UE-context in the eNB-a. These one or more messages may comprise a UE identity and information identifying the eNB-a.

On the network side, the third network element eNB-s2 receives the request for establishing DC. The information identifying the first network element, eNB-a, makes it possible for the third network element, eNB-s2, to establish connectivity with the first network element, eNB-a. The third network element, eNB-s2, may then send the UE identity and an indication to the first network element, eNB-a, that the UE has connected to the third network element via the second link for the purpose of establishing DC. The first network element eNB-a may determine to establish DC for the UE, retrieve the UE context for the identified UE, and transmit the UE context to the third network element eNB-s2, optionally with a confirmation that the DC has been established.

Locating an Existing Instance of the Asynchronous Functions in Case of "Backward Handover"

In this section, the procedure of "backward handover" is described and compared to the procedure of "forward handover". Methods for how to setup the connection to a second link will be described, as well as how to change connection between different nodes of one RAT. Although this procedure is referred to as a handover procedure ("backward" or "forward handover"), it should be noted that the procedure is different from a traditional handover procedure in that the connection to the first link is kept when the connection to the second link is established for the purpose of providing DC. The term "backward/forward handover" is thus used hereinafter to describe that the conventional "backward/forward handover" principles are used for DC establishment.

"Forward handover" is the main principle currently supported when performing for example Packet Switched (PS) handover in 3GPP networks. The principle of "forward handover" is that a source node, i.e. the node that the UE is currently connected to, decides when it is time to perform handover to a target node. This decision in the source node can be based on different information such as measurement reports on possible target cells received from the UE and cell-level load information received from the different possible target nodes. Once the source node decides to initiate handover, it triggers a handover preparation phase towards the target node. The main purpose is to reserve resources on the target node and to allow the target node to give instructions for the UE about how to access the target node, by letting the target node prepare a so called "handover command" message. The "handover command" message is then sent from the target node to the source node which sends it to the UE if the source node still wants to handover the UE to the target node. This later part is called handover execution. The UE uses the information received in the "handover command" message to access the target node and the handover can be completed by for example releasing resources on the source node side. The source node is thus in control of the handover and selects the target node for the UE, which may be seen as a kind of forwarding of the UE to the target node. This explains the name of "forward handover".

"Forward handover" may also work with the split of functionality such as in scenario with the eNB-a and eNB-s split. In the most common case, the UE may be served by the same eNB-a both after and before the handover. Therefore the handover preparation and handover execution are both controlled by the same eNB-a, and the procedure would be similar to the existing handover except that it would be used for establishment of Dual Connectivity. Even if the source and the target cells are controlled by separate eNB-a entities, similar principles may be applied. However, there are cases when the "forward handover" is unsuitable, e.g. in the case when many small cells are deployed in a macro cell thus resulting in physical cell identities of small cells that are not unique. In these cases, the UE would need to perform a procedure similar to Automatic Neighbor Relation (ANR) before a "forward handover" can be triggered. "Forward handover" also implies that connections are pre-established between the different eNB-a and eNB-s, even for the case when these are owned by different operators. In such cases it may be advantageous to use a "backward handover" procedure instead.

Another situation when it may be advantageous to use the "backward handover" procedure is when an existing connection between a wireless device and a single eNB-s (where the eNB-s in turn is connected to an eNB-a) is getting poor, so that measurement reports on the uplink and control commands on the downlink cannot be reached. In this case, the "backward handover" procedure may be used so that the wireless device can establish a new link with a second eNB-s in order to send measurement reports and receive control commands from the previously assigned eNB-a. The UE is losing the first link with an eNB-s1 and therefore tries to establish a second link with an eNB-s2 using a "backward handover" procedure. This is not a conventional handover where there is a context transfer, but rather a context copy. Embodiments described throughout this disclosure may also be applied for this case of establishing connectivity, although it in this case is not a DC situation.

Figure 17:
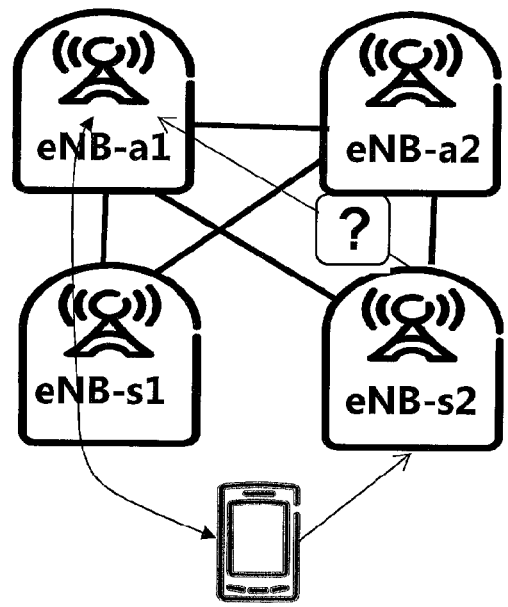
FIG. 17 schematically illustrates a backward handover according to embodiments.

"Backward handover" is different from "forward handover" in the sense that it is the UE that initiates the handover and decides which target cell or node to connect to. In addition, the UE provides information about the source node to the target node, and the target node may use this information to request UE specific information from the source node, and indicate that the UE has moved to another node. In LTE, the procedure called "RRC Connection Reestablishment" is one variant of a "backward handover". However, the "backward handover" procedure introduces problems when DC is to be supported, and when a split functionality architecture is deployed such as the one described with reference to FIG. 15 above. When the UE is initially connected over a first link to eNB-a and eNB-s1, the UE needs to provide additional information to the new target eNB-s2 so that the eNB-s2 can connect to the correct eNB-a. This is due to that the eNB-s2 can be connected to multiple eNB-a (eNB-a1 and eNB-a2) as illustrated in FIG. 17, and must therefore select or locate the correct eNB-a (illustrated by the arrow with the interrogation point to eNB-a1 in FIG. 17). Furthermore, eNB-s2 must refer to the asynchronous function instances that are actually associated to that UE in eNB-a1, thus requiring input related to the UE context.

The solution may be even more complex depending on how eNB-s2 is connected to the cellular operator network in which the network element of the existing asynchronous function, i.e. eNB-a1, currently serving the UE resides. The first aspect is if a secure connection, e.g. an IPsec tunnel or transport mode, or a Secure Sockets Layer/Transport Layer Security (SSL/TLS), is needed from the eNB-s2 to the cellular network of the eNB-a1. In the case secure connections are needed, the next aspect is if the eNB-s2 has an existing secure connection to the cellular network of eNB-a1, or if such a secure connection needs to be established dynamically. Solutions for these different cases are described in the next section.

Embodiments for Different Network Scenarios

When an eNB-s (e.g. eNB-s1 or eNB-s2 in FIG. 17) has located an eNB-a (e.g. eNB-a1 or eNB-a2 in FIG. 17), it can also retrieve information required to establish a UE context in the eNB-s. The eNB-a can transfer information related to the UE context to the eNB-s. The information may e.g. be configuration data for the protocol layers handled by the eNB-s. From the point of view of the eNB-a, this information transfer may possibly involve retrieving parts of the relevant information from an eNB-s that the UE was previously connected to, and which the UE may remain connected to.

The network and the UE support the possibility to have DC for Control Plane only, or for both Control Plane and User Plane.

eNB-s1 and eNB-s2 can support the same RAT, e.g. LTE or 5G, or they can support different RATs. eNB-s1 may for example support LTE while eNB-s2 may support 5G. The example scenarios described below are assumed to be of the latter case i.e. the Multi-RAT case. In the example network scenarios below there exists two instances of eNB-a and eNB-s respectively, and these are called eNB-a1, eNB-a2, eNB-s1 and eNB-s2. However, in the general case the number of instances is not limited to two.

Embodiments of the invention adapted for three different network scenarios are described hereinafter:

1. Scenario 1: Managed network case, no secure connections needed between eNB-a and eNB-s (illustrated in FIG. 18).

2. Scenario 2: Unmanaged network case, secure connections used and pre-established between eNB-a and eNB-s (illustrated in FIG. 19).
3. Scenario 3: Unmanaged network case, secure connections used but not pre-established. The secure connections therefore need to be established between eNB-a and eNB-s (illustrated in FIG. 19).

Scenario 1

Figure 18:
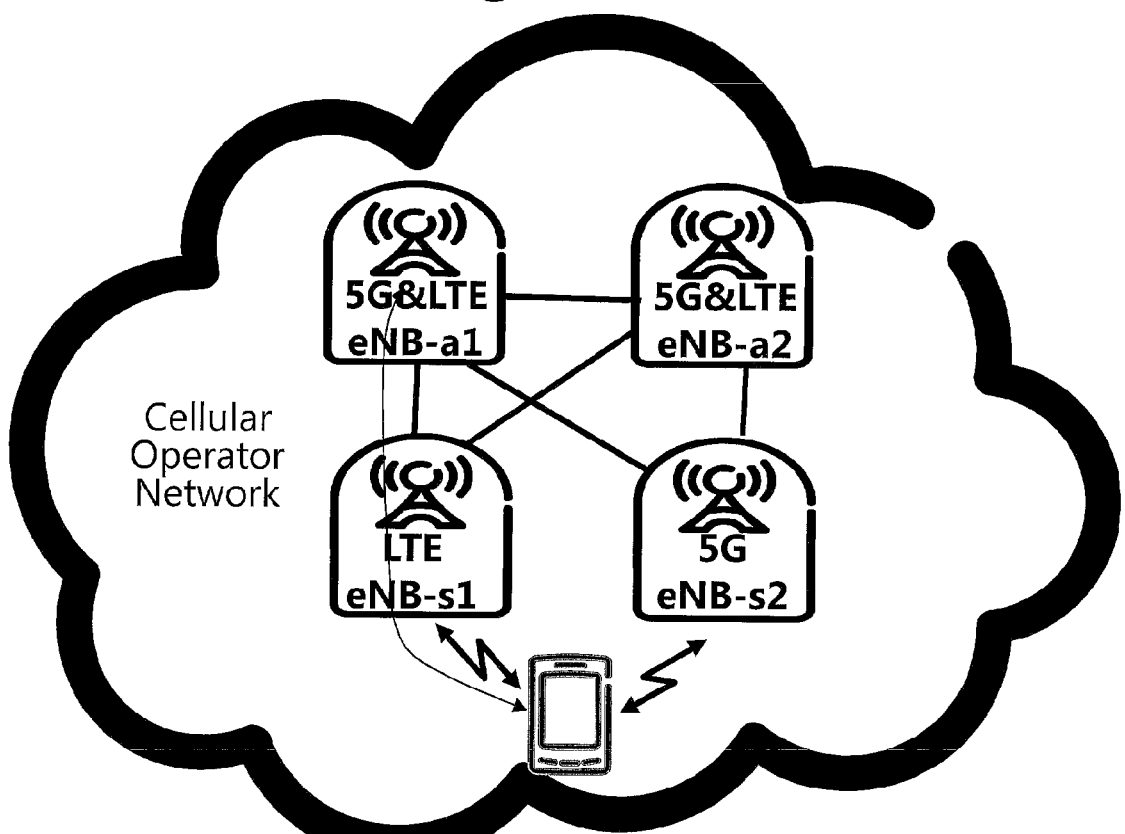
FIG. 18 schematically illustrates a first example network architecture for illustrating embodiments of the invention.

In this case the different eNB-a and eNB-s are connected to the same transport network and no secure connections are used between these nodes. The network architecture is illustrated in FIG. 18.

A UE is initially connected to eNB-a1 and eNB-s1. The solution is based on the UE providing the needed information to eNB-s2 to locate and establish connectivity towards eNB-a1. As an alternative, the connectivity between eNB-a1 and eNB-s2 may already be established and then eNB-s2 selects the one of its eNB-a connections that leads to eNB-a1 based on the information provided by the UE. eNB-s2 also signals to eNB-a1 that the UE has connected to it, together with a UE identifier. This allows the eNB-a1 to activate DC for the UE. As mentioned above, at this point eNB-a1 may transfer information to eNB-s2 that is needed to establish a UE context, e.g. configuration information for lower protocol layers.

Figure 20:
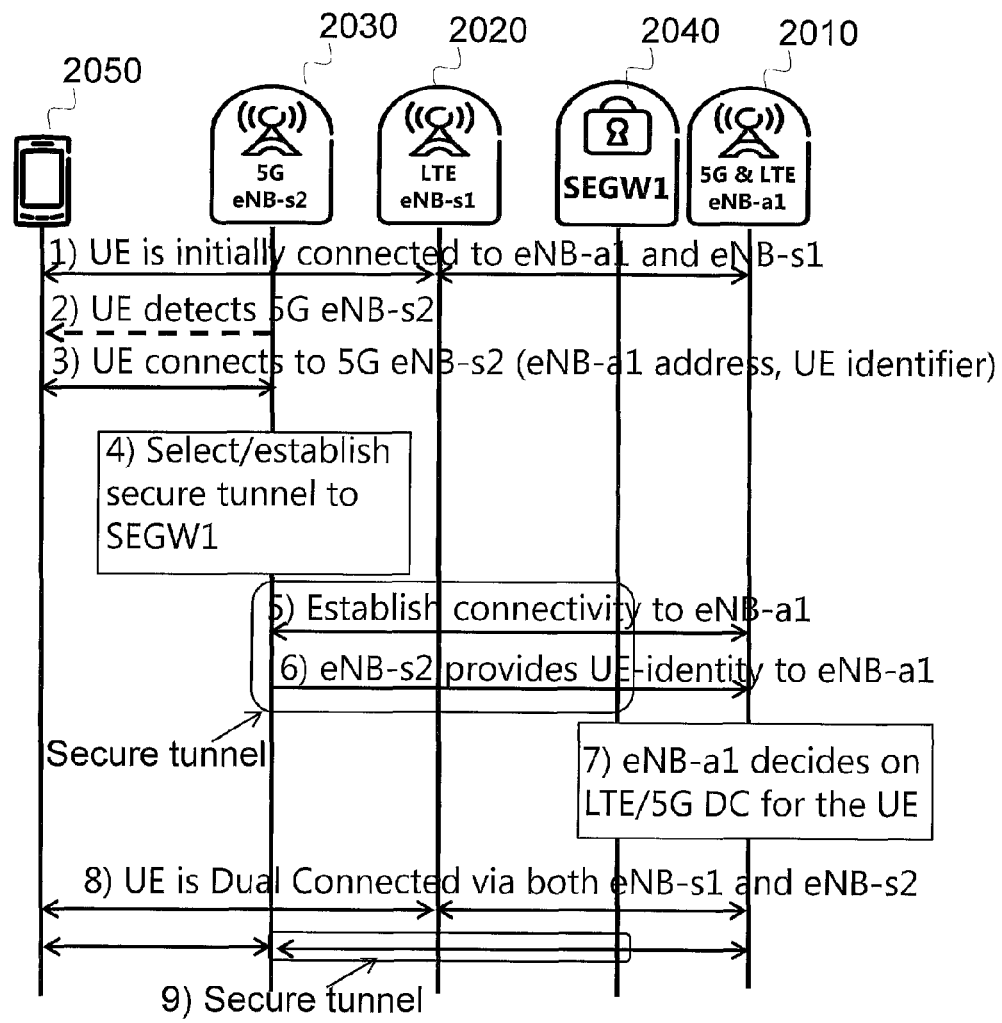
FIG. 20 is a signaling diagram schematically illustrating signaling according to embodiments of the invention.

FIG. 20 is a signaling diagram illustrating the steps of the method according to embodiments of the invention. It should be noted that step 4) and 9) are not part of the method for this scenario as no secure connections or tunnels are needed:

1) The UE 2050 is initially connected to eNB-a1 2010 and eNB-s1 2020. LTE protocols are used for the air interface protocol between eNB-s1 and the UE. As described above, this means the protocol layers PHY, MAC and RLC. The upper layers between the UE and eNB-a1 are RRC and PDCP and these may be based solely on LTE or already at this point indicate the support also for 5G.

2) "Backward handover" is used as the mobility mechanism in the network and the UE detects eNB-s2 as a possible candidate for the UE to establish DC.

3) UE connects to eNB-s2 using 5G RAT mechanisms and provides information about eNB-a1 to eNB-s2. In addition, the UE provides a UE identifier that is known in the eNB-a1, so that the UE RAN context can be identified within eNB-a1. The UE identifier could be anything that uniquely identifies the UE within eNB-a1. With LTE terminology it could for instance be a Cell Radio Network Temporary Identifier (C-RNTI). In such a case the C-RNTI has probably been allocated by the MAC layer in eNB-s1. So in order for this to work, eNB-s1 should have informed eNB-a1 about the C-RNTI allocation and the UE should complement the C-RNTI with an identifier of the cell. With LTE terminology the identifier of the cell could be the E-UTRAN Cell Global Identifier (E-CGI) or the Physical Cell Identifier (PCI) when providing it to eNB-s2. The cell identifier is needed to ensure the uniqueness of the combination of the two identifiers, because the C-RNTI is unique only within a single cell. Furthermore the uniqueness must be ensured also for the case where the UE is already in DC or multi-connectivity through more than one previous cell/eNB-s, and has been allocated one C-RNTI in each of those cells/eNB-s. This implies that it may be preferable to rely on an identifier allocated to the UE by eNB-a1, e.g. an identifier pertaining to a higher protocol layer than MAC, such as the RRC layer. Another alternative is to use an identifier allocated by the core network, which is known to eNB-a1. Other examples of possible UE identifiers to utilize could be the System architecture evolution-Temporary Mobile Subscriber Identity (S-TMSI) or the Globally Unique Temporary Identifier (GUTI) used in LTE. It may also be possible to simply use a special "UE context locator identifier" allocated by eNB-a1 specifically for the purpose of locating the UE context in conjunction with backward handover.

5) The eNB-a1 information, i.e. the information identifying the eNB-a1, can be in different formats. It is used by eNB-s2 to locate eNB-a1 and establish connectivity to eNB-a1. A list of the alternative formats of the information identifying the eNB-a1 is given below:

a) IP-address of eNB-a1: In this case the UE is aware of an IP-address of the eNB-a1, and eNB-s2 uses this information to locate eNB-a1. The locating may include either selection of an existing interface between the eNB-s2 and eNB-a1, or establishment of such an interface dynamically. The IP address has preferably been provided to the UE by eNB-a1, e.g. when the UE connected to eNB-a1 via eNB-s1 or some other eNB-s. In case the current LTE RRC message procedures are used, the IP address could e.g. have been provided in a new IE in the RRCConnectionSetup message or in an RRCConnectionReconfiguration message.

b) Fully Qualified Domain Name (FQDN) of eNB-a1: In this case the UE is aware of a FQDN of the eNB-a1, and the eNB-s2 uses this information to locate eNB-a1. In this case, the eNB-s2 uses a Domain Name Server (DNS) to resolve an eNB-a1 IP-address based on the FQDN. After this step, the locating may include either selection of an existing interface between the eNB-s2 and eNB-a1, or an establishment of such an interface dynamically. The eNB-s2 may also directly select an existing interface without the DNS step if it has performed this step previously and stored/cached the resolved IP address after that. The FQDN has preferably been provided to the UE by eNB-a1, e.g. when the UE connected to eNB-a1 via eNB-s1 or some other eNB-s. In case the current LTE RRC message procedures are used, the FQDN address could e.g. have been provided in a new IE in the RRCConnectionSetup message or in an RRCConnectionReconfiguration message.

c) "Interface identity" of eNB-a1: In this case a specific "Interface identity" is used when a signaling interface is established between the eNB-a1 and eNB-s2. This interface needs to be pre-established before "backward handover" can be performed. The eNB-a1 also informs the UE about the "Interface identity", e.g. as described above for the cases of IP address and FQDN. The UE provides the "interface identity" to the eNB-s2 which uses it to select one of the multiple interfaces it has towards different eNB-a. One example of an "Interface identity" is an eNB-a1 address, for example in the format of a 32 bit string. Another example of the "interface identity" is an eNB-a1 name, for example in the format of a text-string.

d) Uniform Resource Locator (URL): A URL can be used as a combination to address both the eNB-a1 and the UE RAN context. This solution makes a separate UE identifier redundant. Such a URL may e.g. be of the format:

UE-Identifier@eNBa-Identifier.specific.network.rock;
or
eNB-Identifier.specific.network.rock/UE-Identifier.

When the UE sends such a URL to eNB-s2 it can be used as follows. The FQDN part of the URL, i.e. the part after "@" in the first example or before "/" in the second example, is used by eNB-s2 to resolve an IP-address of eNB-a1 via DNS. Once this is done, the username part of the URL, i.e. the part before "@" or after "/", is used as the UE identity towards eNB-a1.

e) Identity of eNB-a1: The UE may have received an identity of eNB-a1 from eNB-a1, e.g. as described above for the cases of IP address and FQDN, and provides this to eNB-s2 together with the UE identity. eNB-s2 uses the eNB-a1 identity and the UE identity to construct a URL, which is then used as described above in the case where the UE provides a URL to eNB-s2.

f) The FQDN/DNS variant can be generalized by having any eNB-a1 identity that can be mapped to an eNB-a1 address via some database, i.e. it doesn't necessarily need to be FQDN and DNS that are used.

6) Once the connectivity between eNB-s2 and eNB-a1 is established, the eNB-s2 sends an indication to the eNB-a1 that the UE has connected to it. The eNB-s2 also sends the UE identifier it received from the UE to the eNB-a1. In return, eNB-a1 may transfer information that enables eNB-s2 to establish a context for the UE, such as configuration information for the protocol layers handled by eNB-s2.

7) eNB-a1 decides that DC for Control Plane only or for both Control and User plane is activated for the UE via both LTE and 5G, and informs the UE accordingly.

8) As a result, the UE may use DC via both LTE and 5G, either for Control Plane only, or for both Control and User plane.

Scenario 2

Figure 19:
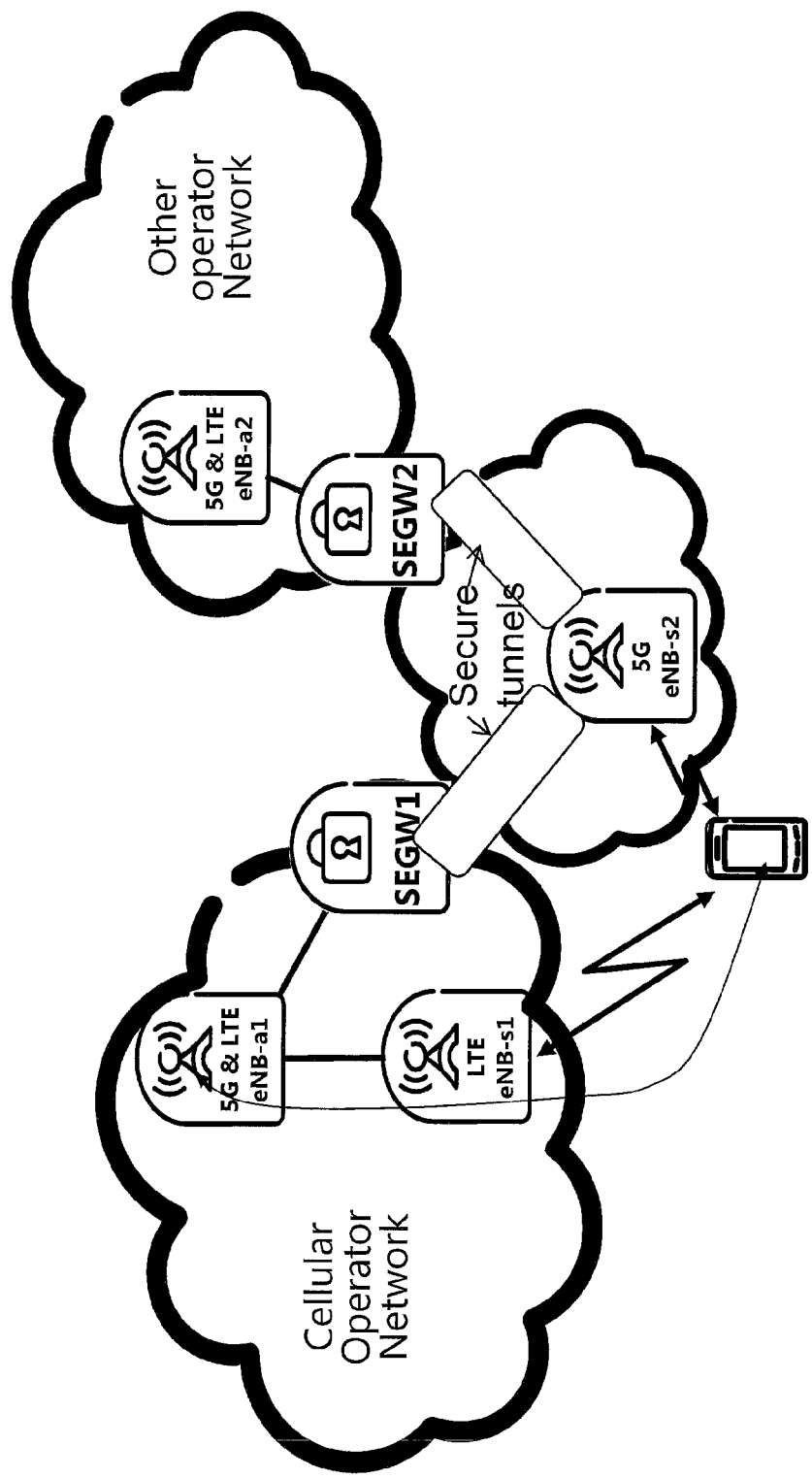
FIG. 19 schematically illustrates a second example network architecture for illustrating embodiments of the invention.

The network architecture of this scenario is illustrated in FIG. 19. The different eNB-a and eNB-s are connected to different transport networks and secure connections are used between these nodes, either directly between the nodes or via separate Security Gateways (SEGW), SEGW1 and SEGW2. In another example scenario, the eNB-a and eNB-s may be connected to the same unsecure transport network. In both examples, the secure connections may be pre-established either when the different functions and nodes are taken into service in case of secure tunnel connections to one or more SEGW, or during operation using Self Organizing Network (SON) functionality, such as Automatic Neighbor Relation (ANR).

There are different additional variants depending on if the secure connection is terminated in the eNB-a (e.g. in eNB-a1) or if there is a separate SEGW between the eNB-a and the eNB-s (e.g. eNB-a1 and eNB-s2). An example of the security connection terminated in the eNB-a is IPsec transport mode or usage of SSL/TLS as the security mechanism. In this case the selection of the secure connection is combined with the selection of the connectivity to eNB-a, as both are pre-established. An example of the case of separate SEGW is the usage of an IPsec tunnel mode. In this case establishment of connectivity to an eNB-a is a two-step process. In a first step, the selection of the secure tunnel connection is performed, followed by a second step of selecting an existing interface to an eNB-a or establishing an interface to an eNB-a.

With reference to FIG. 19, the UE is initially connected to eNB-a1 and eNB-s1. As in scenario 1, the solution is based on the UE providing the needed information to eNB-s2 to locate and establish connectivity towards eNB-a1. However, in this case, the locating may consist of both selecting the correct secure connection and selecting the correct eNB-a. It is also possible that the eNB-s1 is connected to the eNB-a1 via a SEGW and secure tunnel connection, even if FIG. 19 shows the case when eNB-s1 is directly connected to the eNB-a1.

FIG. 20 illustrates the steps of the method according to this embodiments of the invention as well. The initial step of pre-establishing secure tunnel connections between eNB-s2 2030 and SEGW1 2040, and between eNB-s2 2030 and SEGW2 is not illustrated:

1) Same as in scenario 1 (see above).
2) Same as in scenario 1 (see above).
3) Same as in scenario 1 (see above).
4) and 5) The eNB-a1 information can be in different formats and is used by eNB-s2 to locate eNB-a1 and to both select a secure connection and establish connectivity to eNB-a1 as follows:

a) IP-address of eNB-a1: In this case the UE is aware of an IP-address of the eNB-a1, and eNB-s2 uses this information to locate eNB-a1. The IP address has preferably been provided to the UE by eNB-a1, e.g. when the UE connected to eNB-a1 via eNB-s1 or some other eNB-s. In case the current LTE RRC message procedures are used, the IP address may e.g. be provided in a new IE in the RRCConnectionSetup message or in an RRCConnectionReconfiguration message.

Direct secure connections between eNB-a1 and eNB-s2 (i.e. without any intermediate SEGW1): The locating comprises selecting existing secure tunnel connection and interface between the eNB-s2 and eNB-a1.

Separate SEGW1 between eNB-a1 and eNB-s2: The eNB-s2 may use the information to first select a secure tunnel connection based on information about eNB-a addresses accessible via a specific SEGW. This would be possible in the case when globally unique IP-addresses are used for eNB-a (e.g. Public IPv4 or IPv6 addresses) and when the SEGW announces the eNB-a addresses together with all other addresses accessible via it. In this case two SEGW would not announce the same eNB-a address. This case would apply especially for the different operator network case i.e. when the eNB-a1 and eNB-a2 in FIG. 19 are located in different operator networks and different secure domains. It may also be so that the eNB-s2 is configured with knowledge about the IP address space of the operator network(s) it is connected to. That knowledge is enough to select the SEGW leading to the correct operator network for the received eNB-a1 IP address.

b) FQDN of eNB-a1: In this case the UE is aware of a FQDN of the eNB-a2 and the eNB-s2 uses this information to locate eNB-a1. The FQDN has preferably been provided to the UE by eNB-a1, e.g. when the UE connected to eNB-a1 via eNB-s1 or some other eNB-s. In case the current LTE RRC message procedures are used, the FQDN address can e.g. be provided in a new IE in the RRCConnectionSetup message or in the RRCConnectionReconfiguration message.

Direct secure connections between eNB-a1 and eNB-s2 i.e. without any intermediate SEGW: The eNB-s2 uses the FQDN to select an existing secure connection, optionally also using DNS. The basic principle in this case is that the secure connection is associated with either the FQDN or the IP-address of eNB-a1.

Separate SEGW between eNB-a1 and eNB-s2: The eNB-s2 uses the FQDN to first select a pre-established secure tunnel connection based on the FQDN, and then acts as described for scenario 1.

c) "Interface identity" of eNB-a1: The following is valid for both direct secure connections between eNB-a1 and eNB-s2 i.e. without any intermediate SEGW and with a separate SEGW between eNB-a1 and eNB-s2. The option is based on the eNB-a to eNB-s interfaces being both pre-established and associated with a specific secure connection. In this case specific "Interface identity" is used when a signaling interface is established between eNB-a1 and eNB-s2. This interface needs to be pre-established before "backward handover" can be performed. eNB-a1 also informs the UE about the "Interface identity", e.g. as described above for the cases of IP address and FQDN. The UE provides the "interface identity" to eNB-s2 which uses it to select one of the multiple interfaces it has towards different eNB-a. One example of an "Interface identity" is eNB-a1 address, for example in the format of a 32 bit string. Another example of an "interface identity" is eNB-a1 name, for example in the format of a text-string.

d) URL: A URL can be used as a combination to address both the eNB-a1 and the UE (i.e. it makes a separate UE identifier redundant). Such a URL may consist of the format UE-Identifier@eNBa-Identifier.specific.network.rock or eNB-Identifier.specific.network.rock/UE-Identifier. When the UE sends such a URL to eNB-s2 it can be used as follows. The FQDN part of the URL (the part after "@" in the first example or the part before "/" in the second example) is used by eNB-s2 resolve an IP-address of eNB-a1 via DNS. Once this is done, the username part of the URL (the part before "@" or the part after "/") is used as the UE identity towards eNB-a1. The IP-address of eNB-a1 is then used as described above under bullet a).

e) Identity of eNB-a1: The UE may have received an identity of eNB-a1 from eNB-a1, e.g. as described above for the cases of IP address and FQDN, and provides this to eNB-s2 together with the UE identity. eNB-s2 uses the eNB-a1 identity and the UE identity to construct a URL, which is then used as described above in bullet d) where the UE provides a URL to eNB-s2.

g) f) The FQDN/DNS variant can be generalized by having any eNB-a1 identity that can be mapped to an eNB-a1 address via some database, i.e. it doesn't necessarily need to be FQDN and DNS that are used.

6) Same as in scenario 1 (see above).
7) Same as in scenario 1 (see above).
8) Same as in scenario 1 (see above). The UE may thus use DC via both LTE and 5G, either for Control Plane only, or for both Control and User plane.
9) In this scenario, this means that a secure tunnel corresponding to the select secure connection (see 4) and 5) above) between the eNB-s2 and the SEGW1 is used.

Scenario 3

The network architecture of this scenario is illustrated in FIG. 19. The difference from scenario 2 is that the secure connections are not pre-established, nor are the interfaces between eNB-a and eNB-s. The secure connections therefore need to be established.

It is assumed that the eNB-s connect to eNB-a via separate SEGW(s) and that eNB-a (at least eNB-a1) is deployed in the secure domain inside the SEGW(s), while eNB-s (at least eNB-s1 and eNB-s2) are deployed outside said secure domain and SEGW(s). As in scenarios 1 and 2, the UE is initially connected to eNB-a1 and eNB-s1. The solution is based on the UE providing the needed information to eNB-s2 to enable eNB-s2 to establish connectivity towards eNB-a1. In this case, this consist of both establishment of the secure tunnel connection to a correct SEGW and establishment of the interface to the correct eNB-a. On the other hand, if the secure connection is terminated in the interconnected eNB-a and eNB-s, the establishment of the secure connection and of the interface between eNB-a and eNB-s may be combined.

FIG. 20 illustrates the steps of the method according to this embodiment of the invention:

1) Same as in scenario 1 and 2 (see above).
2) Same as in scenario 1 and 2 (see above).
3) Same as in scenario 1 and 2 (see above).
4) and 5) The eNB-a1 information can be in different formats and is used by eNB-s2 to locate eNB-a1 and to establish both a secure connection (directly or via a tunnel to a SEGW) and an interface to eNB-a1 as follows:

a) IP-address of eNB-a1: In this case the UE is aware of an IP-address of the eNB-a1, and eNB-s2 uses this information to locate eNB-a1. The IP address has preferably been provided to the UE by eNB-a1, e.g. when the UE connected to eNB-a1 via eNB-s1 or some other eNB-s. In case the current LTE RRC message procedures are used, the IP address may e.g. be provided in a new IE in the RRCConnectionSetup message or in an RRCConnectionReconfiguration message.

Direct secure connections between eNB-a1 and eNB-s2 (i.e. without any intermediate SEGW1): The eNB-s2 uses the eNB-a1 IP address to establish the secure connection and interface between the eNB-s2 and eNB-a1.

Separate SEGW1 between eNB-a1 and eNB-s2: In this case eNB-s2 may be able to resolve a SEGW IP-address using the IP-address of eNB-a1. One possibility would be to first use Reverse DNS for the IP-address, receive a FQDN, and then derive another FQDN for example by enriching/modifying the first FQDN with "segw", and then sending a DNS query for the second FQDN to retrieve a SEGW IP-address. This would enable eNB-s2 to first establish the secure tunnel connection towards the SEGW IP-address followed by establishment of the interface towards eNB-a1 (traversing the secure tunnel and SEGW). This variant is possible if globally unique IP-addresses are used for eNB-a (e.g. Public IPv4 or IPv6 addresses) so that the Reverse DNS query can return a unique FQDN for eNB-a1. Furthermore, the methods to locate a suitable SEGW when the eNB-a1 information consists of an IP address that are described for scenario 2 can be used in this scenario as well.

b) FQDN of eNB-a1: In this case the UE is aware of a FQDN of the eNB-a2 and the eNB-s2 uses this information to locate eNB-a1. The FQDN has preferably been provided to the UE by eNB-a1, e.g. when the UE connected to eNB-a1 via eNB-s1 or some other eNB-s. In case the current LTE RRC message procedures are used, the FQDN address can e.g. be provided in a new IE in the RRCConnectionSetup message or in the RRCConnectionReconfiguration message.

Direct secure connections between eNB-a1 and eNB-s2, i.e. without any intermediate SEGW: eNB-s2 uses DNS to resolve an IP-address to establish the secure connection and interface between eNB-s2 and eNB-a1.

Separate SEGW between eNB-a1 and eNB-s2: In this case eNB-s2 may be able to resolve a SEGW IP-address using the FQDN of the eNB-a1. One possibility is to derive another FQDN for example by enriching/modifying the eNB-a1 FQDN with "segw", and then sending a DNS query for this modified FQDN to retrieve a SEGW IP-address. This would enable eNB-s2 to first establish the secure tunnel connection towards the SEGW IP-address followed by establishment of the interface towards eNB-a1 via the secure tunnel to the SEGW (after DNS query on FQDN of eNB-a1).
  c) URL: A URL can be used as a combination to address both the eNB-a1 and the UE (i.e. it makes a separate UE identifier redundant). Such a URL may consist of the format UE-Identifier@eNBa-Identifier.specific.network.rock or eNB-Identifier.specific.network.rock/UE-Identifier. When the UE sends such a URL to eNB-s2 it can be used as follows. The FQDN part of the URL (the part after "@" in the first example or the part before "/" in the second example) is used by eNB-s2 resolve an IP-address of eNB-a1 via DNS. Once this is done, the username part of the URL (the part before "@" or the part after "/") is used as the UE identity towards eNB-a1. The IP-address of eNB-a1 is then used as described above under bullet a).
  d) Identity of eNB-a1: The UE may have received an identity of eNB-a1 from eNB-a1, e.g. as described above for the cases of IP address and FQDN, and provides this to eNB-s2 together with the UE identity. eNB-s2 uses the eNB-a1 identity and the UE identity to construct a URL, which is then used as described above in bullet d) where the UE provides a URL to eNB-s2.
  e) The FQDN/DNS variant can be generalized by having any eNB-a1 identity that can be mapped to an eNB-a1 address via some database, i.e. it doesn't necessarily need to be FQDN and DNS that are used.
 6) Same as in scenario 1 and 2 (see above).
 7) Same as in scenario 1 and 2 (see above).
 8) Same as in scenario 1 and 2 (see above). The UE may thus use DC via both LTE and 5G, either for Control Plane only, or for both Control and User plane.
 9) In this scenario, this means that a secure tunnel corresponding to the established secure connection (see 4) and 5) above) between the eNB-s2 and the SEGW1 is used.

Potential Additional Security

To prevent a malicious UE from making an eNB-s access using the context of another UE in an eNB-a, additional security means may be applied. One such means could come in the form a security token that is allocated by the eNB-a to the UE. The token could e.g. be a randomly generated bit string with the optional constraint that it should be unique within the eNB-a as long as the UE context remains in the eNB-a. The security token should be delivered to the UE when ciphering is activated between the UE and the eNB-a. In LTE this could be done in a new IE in an RRCConnectionReconfiguration message or using a new RRC message. The UE should provide the token to the eNB-s together with the above described parameters for locating and identifying the UE context. The eNB-s then includes it in its message indicating the UE context to the eNB-a, i.e. when the eNB-s informs the eNB-a that the UE is connecting to the eNB-s. The eNB-a then verifies the token and, if the verification is successful, accepts the context access and the information that the UE is connecting to the eNB-s. The eNB-a may return information that the eNB-s needs to establish a UE context, such as configuration information for lower layer protocols. If the token has to be transferred unencrypted from the UE to the eNB-s, the eNB-a should allocate a new token to the UE every time it has been used. An alternative is that the UE encrypts the token in a manner agreed with eNB-a, e.g. using a shared symmetric key, when transferring it to the eNB-s. In this way the token would not be exposed and could be reused multiple times.

An alternative to the above described verification principle could be that the eNB-s does not include the token in the request to the eNB-a. Instead, the eNB-a includes the token when it acknowledges the message from the eNB-s and returns the information that facilitates UE context establishment to the eNB-s. The eNB-s can then compare the token received from the eNB-a with the one received from the UE and verify that they match.

Idle-to-Connect Case

Similarly to the above described scenarios 1-3 for establishing DC using "backward handover", there is no known procedure for the case where the wireless device is in idle state and thus has no connectivity to any eNB-s at all, but wants to establish such connectivity. Also in this scenario there may be an instance of eNB-a pertaining to the wireless device which has to be located. One such scenario may be when a given wireless device has its eNB-a instance associated to an eNB-s of a first link and after some time stops to transmit. The device association at the eNB-a is kept. From the network perspective the wireless device is still connected to the eNB-a. When the wireless device wants to transmit again over the same first link or over another link, the association between the eNB-s and eNB-a has to be re-established. Embodiments of the invention may be applicable also in such a scenario.

Embodiments of Methods Described With Reference to FIGS. 21-23

Figure 21A:
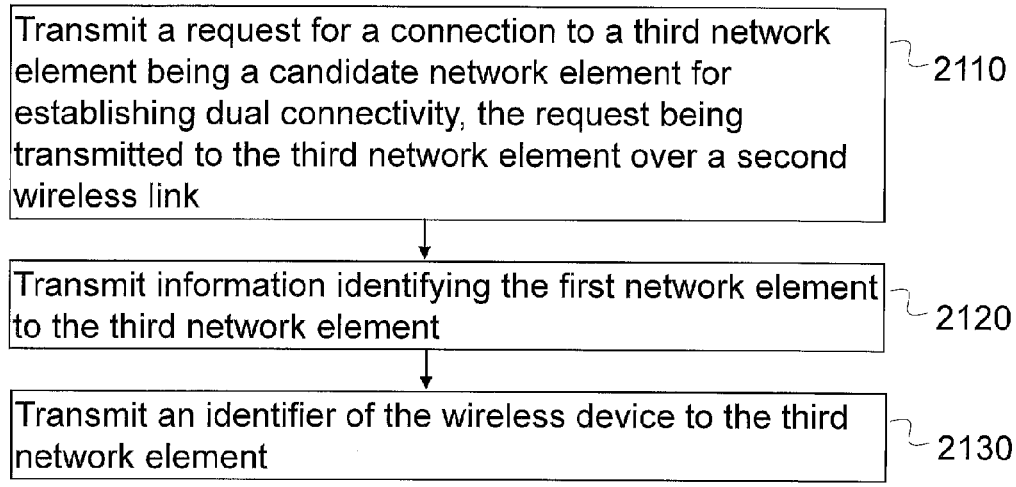
FIGS. 21a-b are flow charts schematically illustrating embodiments of a method for a wireless device according to various embodiments.

FIG. 21a is a flowchart illustrating one embodiment of a method for supporting establishment of DC for a wireless device 2050. The wireless device is connected to a first network element 2010 via a second network element 2020 of a wireless communication network. The first network element 2010 may be the eNB-a1 in the example embodiments of scenarios 1-3 above, and the second network element 2020 may be the eNB-s1. The second network element and the wireless device are communicating over a first wireless link. Network functions serving the wireless device are split between the first network element and the second network element. The method is performed in the wireless device and comprises:
  2110: Transmitting a request for a connection to a third network element 2030 being a candidate network element for establishing DC, the request being transmitted to the third network element over a second wireless link. The third network element may be the eNB-s2 in the example embodiments of scenarios 1-3 above. The first and the second wireless links may both be associated with one RAT, or each associated with different RATs, such as LTE and 5G.
  2120: Transmitting information identifying the first network element to the third network element, such that the third network element can establish connectivity to the first network element. The information identifying the first network element may be received from the first network element, and may comprise one or more of the following: an IP address of the first network element; a FQDN of the first network element; an identity of an interface to the first network element; and a URL of the first network element.

2130: Transmitting an identifier of the wireless device to the third network element, for enabling the establishment of DC for the wireless device.

Figure 21B:
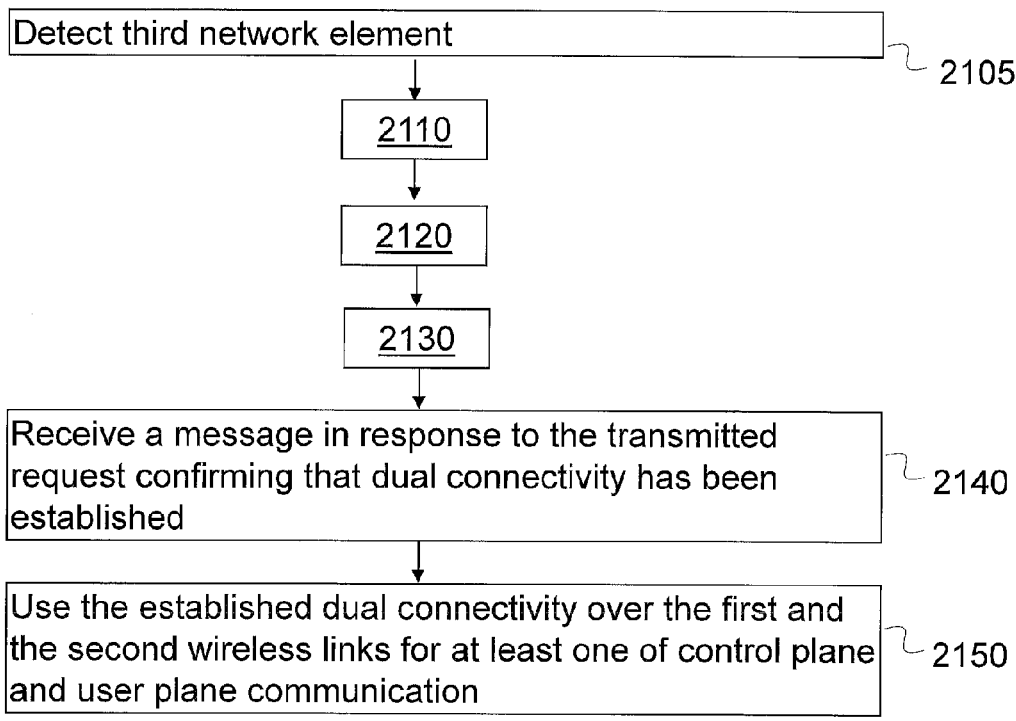

FIG. 21b is a flowchart illustrating another embodiment of the method in the wireless device. The method may comprise:

2105: Detecting the third network element (as in signal 2 of the signaling diagram in FIG. 20).

2110: Transmitting a request for a connection to a third network element 2030 being a candidate network element for establishing DC, the request being transmitted to the third network element over a second wireless link. The third network element may be the eNB-s2 in the example embodiments of scenarios 1-3 above. The first and the second wireless links may both be associated with one RAT, or each associated with different RATs, such as LTE and 5G.

2120: Transmitting information identifying the first network element to the third network element, such that the third network element can establish connectivity to the first network element. The information identifying the first network element may be received from the first network element, and may comprise one or more of the following: an IP address of the first network element; a FQDN of the first network element; an identity of an interface to the first network element; and a URL of the first network element.

2130: Transmitting an identifier of the wireless device to the third network element, for enabling the establishment of DC for the wireless device.

2140: Receive a message in response to the transmitted request, confirming that DC has been established, wherein the message is received from one of the third network element, the second network element, or the first network element via the second or third network element.

2150: Using the established DC over the first and the second wireless links for at least one of control plane and user plane communication In any of the above described embodiments, the network functions of the first network element may be asynchronous network functions, and the network functions of the second and third network elements may be synchronous network functions. The synchronous network functions of the second network element have requirements on processing timing which are strictly dependent on timing of the first wireless link. The synchronous network functions of the third network element have requirements on processing timing which are strictly dependent on timing of the second wireless link. The asynchronous network functions have requirements on processing timing not strictly dependent on the timing of any of the first or second wireless links.

Figure 22A:
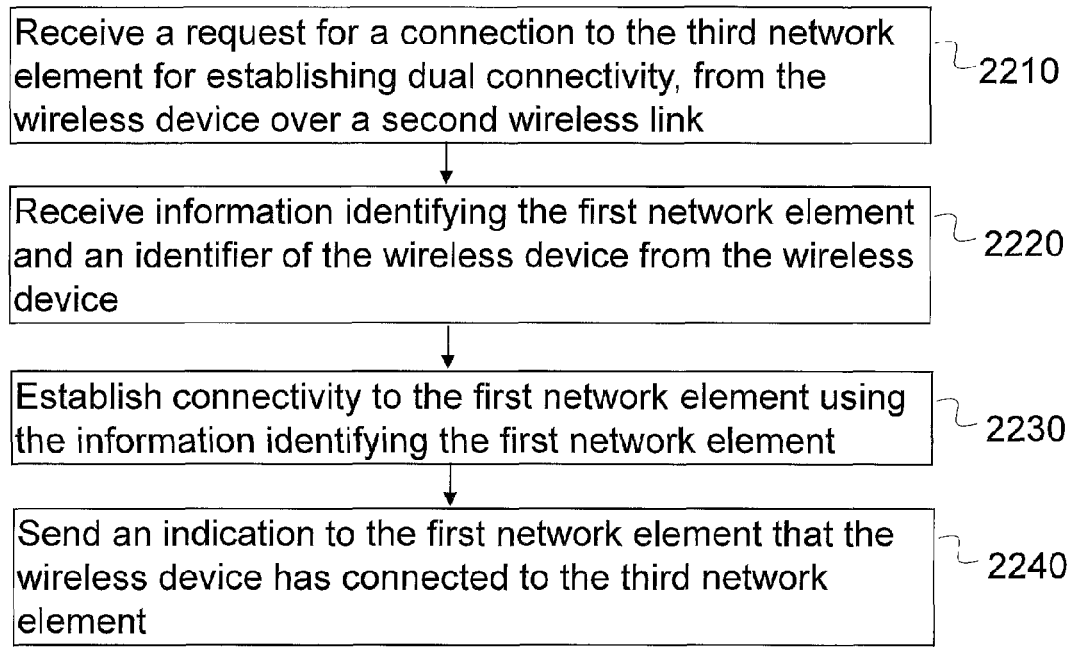
FIGS. 22a-b are flow charts schematically illustrating embodiments of a method for a network element according to various embodiments.

FIG. 22a is a flowchart illustrating one embodiment of a method for supporting establishment of DC for a wireless device 2050. The wireless device is connected to a first network element 2010 via a second network element 2020 of a wireless communication network. The second network element and the wireless device are communicating over a first wireless link. Network functions serving the wireless device are split between the first network element and the second network element. The method is performed in a third network element 2030, which is a candidate network element for the establishment of DC for the wireless device. The method comprises:

2210: Receiving a request for a connection to the third network element. The request is received from the wireless device over a second wireless link. The first and the second wireless links may both be associated with one RAT, or each associated with different RATs, such as LTE and 5G.

2220: Receiving information identifying the first network element and an identifier of the wireless device from the wireless device. The information identifying the first network element may comprise one or more of the following: an IP address of the first network element; a FQDN of the first network element; an identity of an interface to the first network element; and a URL of the first network element.

2230: Establishing connectivity to the first network element using the information identifying the first network element.

2240: Sending an indication to the first network element that the wireless device has connected to the third network element, the indication comprising the identifier of the wireless device.

Figure 22B:
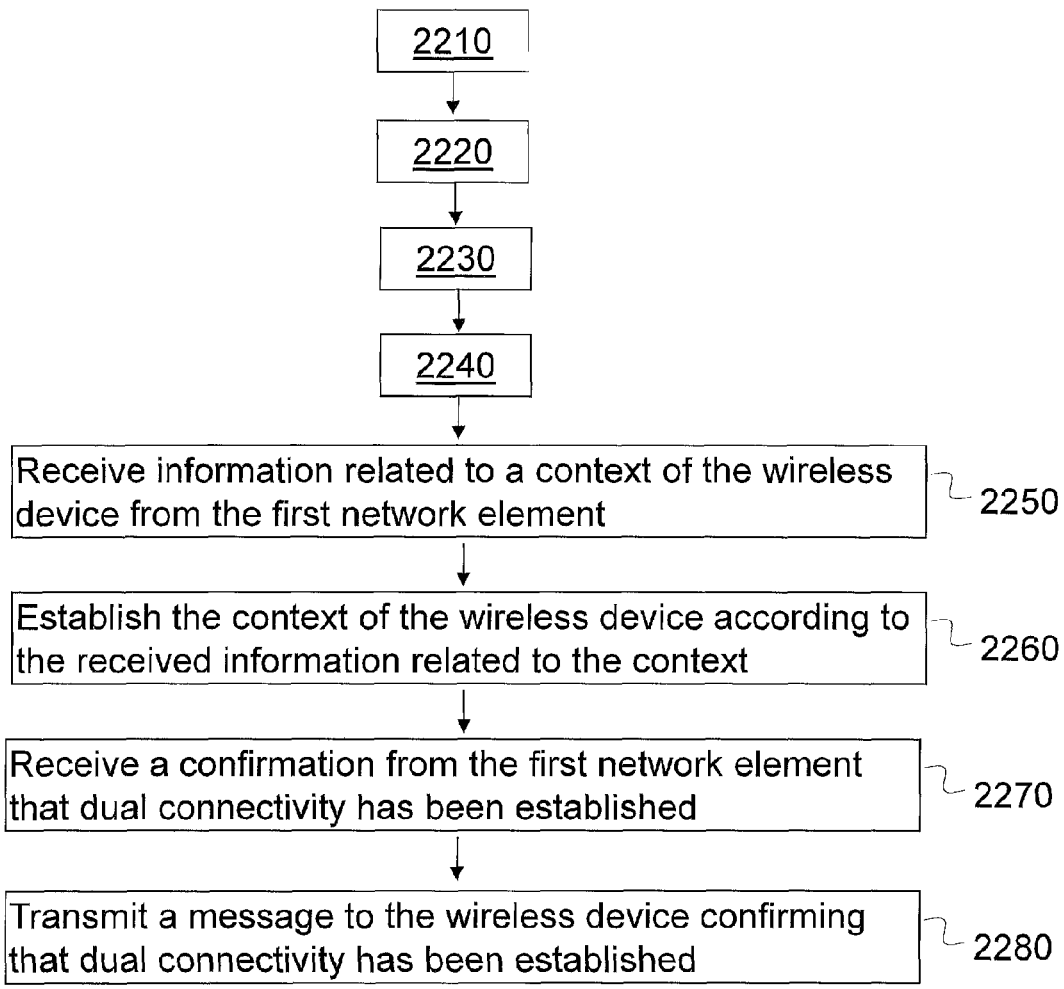

FIG. 22b is a flowchart illustrating another embodiment of the method in the third network element 2030. The method may comprise in addition to the steps 2210-2240 described above with reference to FIG. 22a:

2250: Receiving information related to a context of the wireless device from the first network element in response to sending 2240 the indication.

2260: Establishing the context of the wireless device according to the received information related to the context.

In embodiments, the method may further comprise:

2270: Receiving a confirmation from the first network element that DC has been established.

2280: Transmitting a message to the wireless device confirming that DC has been established. Transmitting the message may simply comprise forwarding the confirmation from the first network element to the wireless device. The third network element may e.g. forward the message transparently.

In any of the embodiments described above, establishing 2230 connectivity may comprise locating the first network element based on the received information identifying the first network element, and establishing connectivity to the located first network element. This is applicable to any of the scenarios 1-3 described above. Furthermore, establishing 2230 connectivity may further comprises either selecting an existing secure connection between the third network element and the first network element for establishing the connectivity as in scenario 2 where the secure connections are pre-established; or establishing a secure connection between the third network element and the first network element as in scenario 3. It should be noted that a secure connection between the third network element and the first network element may be a secure connection directly between the third network element and the first network element. Alternatively it may be a secure connection between the third network element and a SEGW placed between the two network elements, i.e. the secure connection terminates at the SEGW.

In any of the above described embodiments, the network functions of the first network element may be asynchronous network functions, and the network functions of the second and third network elements may be synchronous network functions. The synchronous network functions of the second network element have requirements on processing timing which are strictly dependent on timing of the first wireless link. The synchronous network functions of the third network element have requirements on processing timing which are strictly dependent on timing of the second wireless link. The asynchronous network functions have requirements on processing timing not strictly dependent on the timing of any of the first or second wireless links.

Figure 23A:
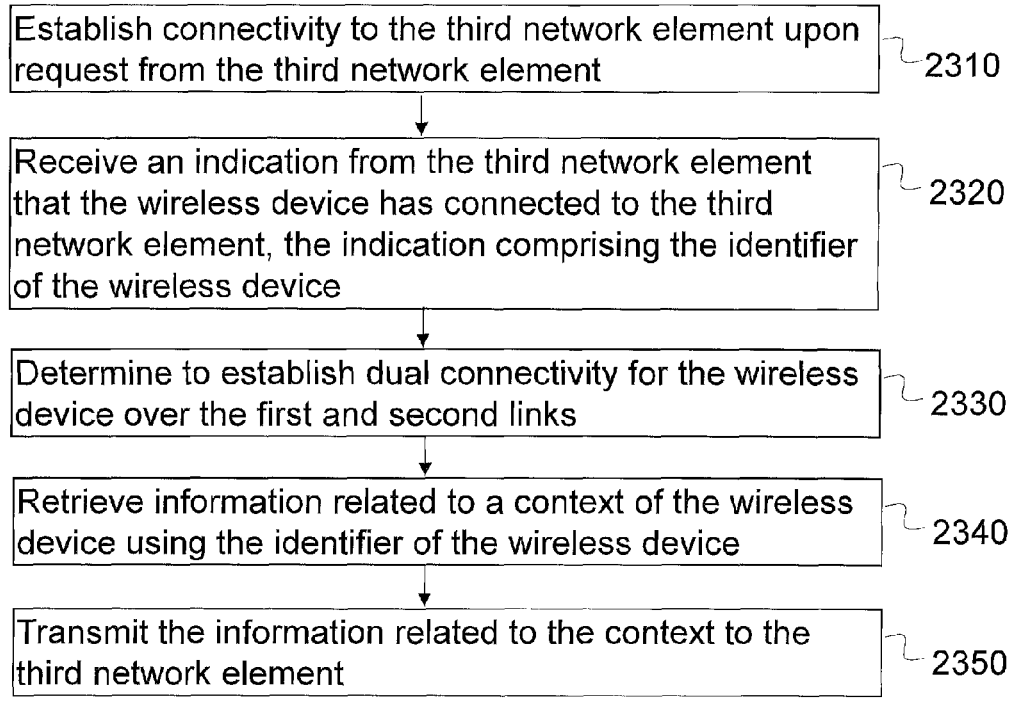
FIGS. 23a-b are flow charts schematically illustrating embodiments of a method for another network element according to various embodiments.

FIG. 23a is a flowchart illustrating one embodiment of a method for supporting establishment of DC for a wireless device 2050. The wireless device is connected to a first network element 2010 via a second network element 2020 of a wireless communication network. The second network element and the wireless device are communicating over a first wireless link. Network functions serving the wireless device are split between the first network element and the second network element. A third network element 2030 is a candidate network element for the establishment of DC for the wireless device. The third network element and the wireless device are communicating over a second wireless link. The method is performed in the first network element. The method comprises:

2310: Establishing connectivity to the third network element upon request from the third network element. Establishing connectivity may comprise establishing a secure connection between the third network element and the first network element upon request from the third network element, as in scenario 3 when the secure connection is terminated in the first network element and not in the SEGW.

2320: Receiving an indication from the third network element that the wireless device has connected to the third network element. The indication comprises the identifier of the wireless device.

2330: Determining to establish DC for the wireless device over the first and second links.

2340: Retrieving information related to a context of the wireless device using the identifier of the wireless device.

2350: Transmitting the information related to the context to the third network element.

Figure 23B:
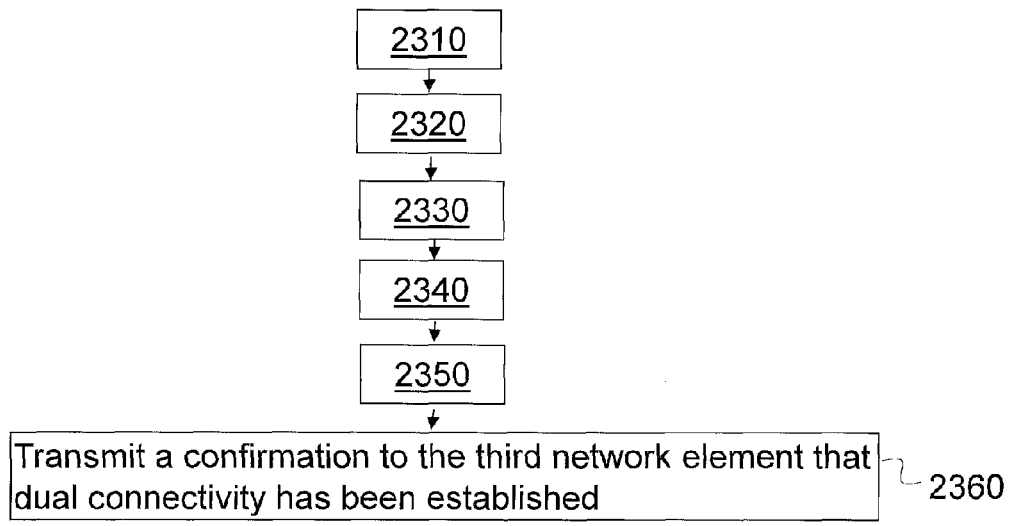

FIG. 23b is a flowchart illustrating another embodiment of the method in the first network element 2010. The method may comprise in addition to the steps 2310-2350 described above with reference to FIG. 23a:

2360: Transmitting a confirmation to the third network element that DC has been established.

In any of the above described embodiments, the network functions of the first network element may be asynchronous network functions, and the network functions of the second and third network elements may be synchronous network functions. The synchronous network functions of the second network element have requirements on processing timing which are strictly dependent on timing of the first wireless link. The synchronous network functions of the third network element have requirements on processing timing which are strictly dependent on timing of the second wireless link. The asynchronous network functions have requirements on processing timing not strictly dependent on the timing of any of the first or second wireless links.

Embodiments of Apparatus Described With Reference to FIGS. 24a-b Wireless Device An embodiment of a wireless device 2050 is schematically illustrated in the block diagram in FIG. 24a. The wireless device is configured to support establishment of DC for the wireless device. The wireless device is connected to a first network element 2010 via a second network element 2020 of a wireless communication network. The second network element and the wireless device are communicating over a first wireless link. Network functions serving the wireless device are split between the first network element and the second network element.

The wireless device is further configured to transmit a request for a connection to a third network element 2030 being a candidate network element for establishing DC. The request is transmitted to the third network element over a second wireless link. The wireless device is also configured to transmit information identifying the first network element to the third network element, such that the third network element can establish connectivity to the first network element. The wireless device may be configured to receive the information identifying the first network element from the first network element. The information identifying the first network element may comprise at least one of the following: an IP address of the first network element; a FQDN of the first network element; an identity of an interface to the first network element; and a URL of the first network element. The wireless device is further configured to transmit an identifier of the wireless device to the third network element, for enabling the establishment of DC for the wireless device.

In embodiments, the wireless device 2050 may be further configured to detect the third network element. Furthermore, the wireless device 2050 may be configured to receive a message in response to the transmitted request, confirming that DC has been established. The message may be received from either the third network element, or the second network element, or from the first network element via the second or third network element. In embodiments, the wireless device 2050 may be further configured to use the established DC over the first and the second wireless links for at least one of control plane and user plane communication. The first and the second wireless links may both be associated with one RAT, or each associated with different RATs, such as LTE and 5G.

In any of the above described embodiments, the network functions of the first network element may be asynchronous network functions, and the network functions of the second and third network elements may be synchronous network functions. The synchronous network functions of the second network element have requirements on processing timing which are strictly dependent on timing of the first wireless link. The synchronous network functions of the third network element have requirements on processing timing which are strictly dependent on timing of the second wireless link. The asynchronous network functions have requirements on processing timing not strictly dependent on the timing of any of the first or second wireless links.

Figure 24A:
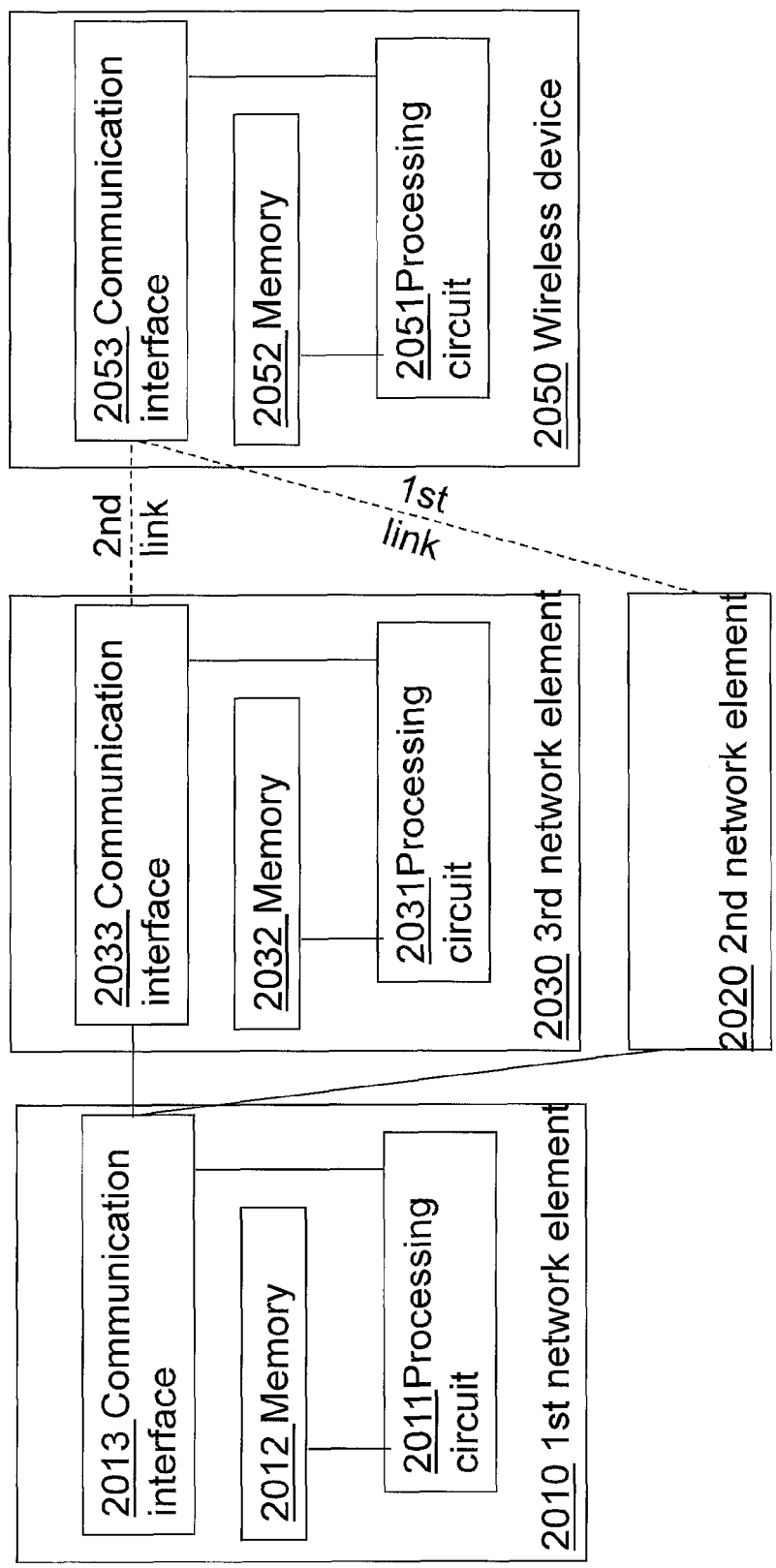
FIGS. 24a-b are block diagrams schematically illustrating embodiments of wireless device and network elements according to various embodiments.

As illustrated in FIG. 24a, the wireless device 2050 may comprise a processing circuit 2051 and a memory 2052 in embodiments of the invention. The wireless device 2050 may also comprise a communication interface 2053 configured to communicate with the second and third network elements over the first and second wireless links. The wireless device 2050 may in embodiments comprise a transceiver adapted to communicate wirelessly with the second and third network elements. The memory 2052 may contain instructions executable by said processing circuit 2051, whereby the wireless device 2050 may be operative to transmit a request for a connection to the third network element 2030 being a candidate network element for establishing DC. The request is transmitted to the third network element over a second wireless link. The wireless device 2050 may also be operative to transmit information identifying the first network element to the third network element, such that the third network element can establish connectivity to the first network element. The wireless device 2050 may be further operative to transmit an identifier of the wireless device to the third network element, for enabling the establishment of DC for the wireless device.

Figure 24B:
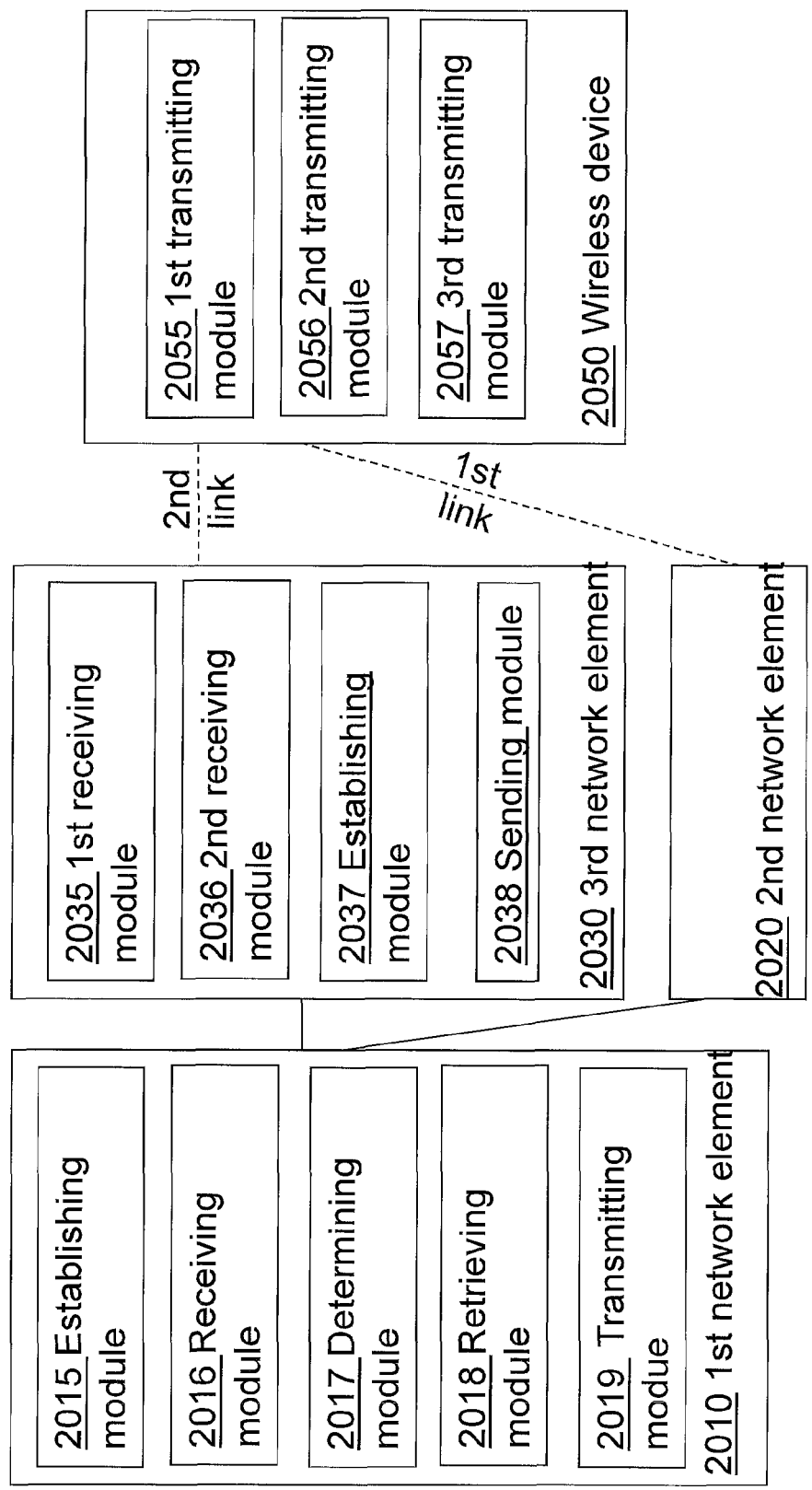

In an alternative way to describe the embodiment in FIG. 24a illustrated in FIG. 24b, the wireless device 2050 may comprise a first transmitting module 2055 adapted to transmit a request for a connection to a third network element 2030 being a candidate network element for establishing DC. The request is transmitted to the third network element over a second wireless link. The wireless device 2050 may also comprise a second transmitting module 2056 adapted to transmit information identifying the first network element to the third network element, such that the third network element can establish connectivity to the first network element. The wireless device may be configured to receive the information identifying the first network element from the first network element. The information identifying the first network element may comprise at least one of the following: an IP address of the first network element; a FQDN of the first network element; an identity of an interface to the first network element; and a URL of the first network element. The wireless device 2050 may further comprise a third transmitting module 2057 adapted to transmit an identifier of the wireless device to the third network element, for enabling the establishment of DC for the wireless device.

In embodiments, the wireless device 2050 may further comprise a detecting module adapted to detect the third network element. Furthermore, the wireless device 2050 may comprise a receiving module adapted to receive a message in response to the transmitted request, confirming that DC has been established. The message may be received from either the third network element, or the second network element, or from the first network element via the second or third network element. In embodiments, the wireless device 2050 may further comprise a communication module adapted to use the established DC over the first and the second wireless links for at least one of control plane and user plane communication. The first and the second wireless links may both be associated with one RAT, or each associated with different RATs, such as LTE and 5G.

The modules described above are functional units which may be implemented in hardware, software, firmware or any combination thereof. In one embodiment, the modules are implemented as a computer program running on a processor.

In still another alternative way to describe the embodiment in FIG. 24a, the wireless device 2050 may comprise a Central Processing Unit (CPU) which may be a single unit or a plurality of units. Furthermore, the wireless device 2050 may comprise at least one computer program product (CPP) with a computer readable medium in the form of a non-volatile memory, e.g. an EEPROM (Electrically Erasable Programmable Read-Only Memory), a flash memory or a disk drive. The CPP may comprise a computer program stored on the computer readable medium, which comprises code means which when run on the CPU of the wireless device 2050 causes the wireless device 2050 to perform the methods described earlier in conjunction with FIGS. 21a-b. In other words, when said code means are run on the CPU, they correspond to the processing circuit 2051 of the wireless device 2050 in FIG. 24a.

Third Network Element

An embodiment of the third network element 2030 is schematically illustrated in the block diagram in FIG. 24a. The third network element 2030 is initially a candidate network element for the establishment of DC for the wireless device 2050. The third network element 2030 is configured to support the establishment of the DC. The wireless device is connectable to the first network element 2010 via the second network element 2020 of a wireless communication network. The second network element and the wireless device are communicating over a first wireless link. Network functions serving the wireless device are split between the first network element and the second network element.

The third network element is configured to receive a request for a connection to the third network element. The request is received from the wireless device over a second wireless link. The first and the second wireless links may both be associated with one RAT, or each associated with different RATs, such as LTE and 5G. The third network element is further configured to receive information identifying the first network element and an identifier of the wireless device from the wireless device, and establish connectivity to the first network element using the received information identifying the first network element. The information identifying the first network element may comprise at least one of the following: an IP address of the first network element; a FQDN of the first network element; an identity of an interface to the first network element; and a URL of the first network element. The third network element is also configured to send an indication to the first network element that the wireless device has connected to the third network element. The indication comprises the identifier of the wireless device.

In embodiments, the third network element 2030 may be further configured to receive information related to a context of the wireless device from the first network element in response to sending the indication, and establish the context of the wireless device according to the received information related to the context.

The third network element may be further configured to establish connectivity to the first network element by locating the first network element based on the received information identifying the first network element, and establishing connectivity to the located first network element. In some embodiments, the third network element may be further configured to establish connectivity by selecting an existing secure connection between the third network element and the first network element for establishing the connectivity, or establishing a secure connection between the third network element and the first network element. It should be noted that a secure connection between the third network element and the first network element may be a secure connection directly between the third network element and the first network element. Alternatively it may be a secure connection between the third network element and a SEGW placed between the two network elements, i.e. the secure connection terminates at the SEGW.

In embodiments, the third network element 2030 may be further configured to receive a confirmation from the first network element that DC has been established, and transmit a message to the wireless device confirming that DC has been established. The third network element 2030 may be configured to transmit the message by forwarding the confirmation from the first network element to the wireless device.

In any of the above described embodiments, the network functions of the first network element may be asynchronous network functions, and the network functions of the second and third network elements may be synchronous network functions. The synchronous network functions of the second network element have requirements on processing timing which are strictly dependent on timing of the first wireless link. The synchronous network functions of the third network element have requirements on processing timing which are strictly dependent on timing of the second wireless link. The asynchronous network functions have requirements on processing timing not strictly dependent on the timing of any of the first or second wireless links.

As illustrated in FIG. 24a, the third network element 2030 may comprise a processing circuit 2031 and a memory 2032 in embodiments of the invention. The third network element 2030 may also comprise a communication interface 2033 configured to communicate with the wireless device 2050 over the second wireless link, and with the first network element 2010. The third network element 2030 may in embodiments comprise a transceiver adapted to communicate wirelessly with the wireless device 2050. The memory 2032 may contain instructions executable by said processing circuit 2031, whereby the third network element 2030 may be operative to receive a request for a connection to the third network element, where the request is received from the wireless device over a second wireless link. The third network element 2030 may also be operative to receive information identifying the first network element and an identifier of the wireless device from the wireless device, and establish connectivity to the first network element using the received information identifying the first network element. The third network element 2030 may be further operative to send an indication to the first network element that the wireless device has connected to the third network element, where the indication comprises the identifier of the wireless device.

In an alternative way to describe the third network element illustrated in FIG. 24b, the third network element 2030 may comprise a first receiving module 2035 adapted to receive a request for a connection to the third network element, where the request is received from the wireless device over a second wireless link. The third network element 2030 may also comprise a second receiving module 2036 adapted to receive information identifying the first network element and an identifier of the wireless device from the wireless device. The information identifying the first network element may comprise at least one of the following: an IP address of the first network element; a FQDN of the first network element; an identity of an interface to the first network element; and a URL of the first network element. The third network element 2030 may also comprise an establishing module 2037 adapted to establish connectivity to the first network element using the received information identifying the first network element. The third network element 2030 may also comprise a sending module 2038 adapted to send an indication to the first network element that the wireless device has connected to the third network element, where the indication comprises the identifier of the wireless device.

In embodiments, the third network element 2030 may further comprise a third receiving module adapted to receive information related to a context of the wireless device from the first network element, and a further establishing module adapted to establish the context of the wireless device according to the received information related to the context. Furthermore, the third network element 2030 may comprise a fourth receiving module adapted to receive a confirmation from the first network element that DC has been established, and a transmitting module adapted to transmit a message to the wireless device confirming that DC has been established.

The modules described above are functional units which may be implemented in hardware, software, firmware or any combination thereof. In one embodiment, the modules are implemented as a computer program running on a processor.

In still another alternative way to describe the embodiment in FIG. 24a, the third network element 2030 may comprise a Central Processing Unit (CPU) which may be a single unit or a plurality of units. Furthermore, the third network element 2030 may comprise at least one computer program product (CPP) with a computer readable medium in the form of a non-volatile memory, e.g. an EEPROM (Electrically Erasable Programmable Read-Only Memory), a flash memory or a disk drive. The CPP may comprise a computer program stored on the computer readable medium, which comprises code means which when run on the CPU of the third network element 2030 causes the third network element 2030 to perform the methods described earlier in conjunction with FIGS. 22a-b. In other words, when said code means are run on the CPU, they correspond to the processing circuit 2031 of the third network element 2030 in FIG. 24a.

First Network Element

An embodiment of the first network element 2010 is schematically illustrated in the block diagram in FIG. 24a. The first network element 2010 is configured to support establishment of DC for the wireless device 2050. The wireless device is connectable to the first network element via a second network element 2020 of the wireless communication network, where the second network element and the wireless device are communicating over a first wireless link. Network functions for serving the wireless device are split between the first network element and the second network element. A third network element 2030 is a candidate network element for the establishment of DC for the wireless device, where the third network element and the wireless device are communicating over a second wireless link.

The first network element 2010 is configured to establish connectivity to the third network element upon request from the third network element, and receive an indication from the third network element that the wireless device has connected to the third network element, where the indication comprises the identifier of the wireless device. The first network element 2010 is also configured to determine to establish DC for the wireless device over the first and second links. Furthermore, the first network element 2010 is configured to retrieve information related to a context of the wireless device using the identifier of the wireless device, and transmit the information related to the context to the third network element.

In embodiments, the first network element 2010 may be configured to establish connectivity to the third network element by establishing a secure connection between the third network element and the first network element upon request from the third network element. The first network element 2010 may be further configured to transmit a confirmation to the third network element that DC has been established.

In any of the above described embodiments, the network functions of the first network element may be asynchronous network functions, and the network functions of the second and third network elements may be synchronous network functions. The synchronous network functions of the second network element have requirements on processing timing which are strictly dependent on timing of the first wireless link. The synchronous network functions of the third network element have requirements on processing timing which are strictly dependent on timing of the second wireless link. The asynchronous network functions have requirements on processing timing not strictly dependent on the timing of any of the first or second wireless links.

As illustrated in FIG. 24a, the first network element 2010 may comprise a processing circuit 2011 and a memory 2012 in embodiments of the invention. The first network element 2010 may also comprise a communication interface 2013 configured to communicate with the second and third network elements 2020 and 2030. The memory 2012 may contain instructions executable by said processing circuit 2011, whereby the first network element 2010 may be operative to establish connectivity to the third network element upon request from the third network element, and receive an indication from the third network element that the wireless device has connected to the third network element. The indication comprises the identifier of the wireless device. The first network element 2010 may be further operative to determine to establish DC for the wireless device over the first and second links. The first network element 2010 may also be operative to retrieve information related to a context of the wireless device using the identifier of the wireless device, and transmit the information related to the context to the third network element.

In an alternative way to describe the first network element 2010 illustrated in FIG. 24b, the first network element 2010 may comprise an establishing module 2015 adapted to establish connectivity to the third network element upon request from the third network element. The first network element 2010 may comprise a receiving module 2016 adapted to receive an indication from the third network element that the wireless device has connected to the third network element, the indication comprising the identifier of the wireless device. The first network element 2010 may also comprise a determining module 2017 adapted to determine to establish DC for the wireless device over the first and second links. Furthermore, the first network element 2010 may comprise a retrieving module 2018 adapted to retrieve information related to a context of the wireless device using the identifier of the wireless device, and a transmitting module 2019 adapted to transmit the information related to the context to the third network element.

In embodiments, the first network element 2010 may further comprise a further transmitting module adapted to transmit a confirmation to the third network element 2030 that DC has been established.

The modules described above are functional units which may be implemented in hardware, software, firmware or any combination thereof. In one embodiment, the modules are implemented as a computer program running on a processor.

In still another alternative way to describe the embodiment in FIG. 24a, the first network element 2010 may comprise a Central Processing Unit (CPU) which may be a single unit or a plurality of units. Furthermore, the first network element 2010 may comprise at least one computer program product (CPP) with a computer readable medium in the form of a non-volatile memory, e.g. an EEPROM (Electrically Erasable Programmable Read-Only Memory), a flash memory or a disk drive. The CPP may comprise a computer program stored on the computer readable medium, which comprises code means which when run on the CPU of the first network element 2010 causes the first network element 2010 to perform the methods described earlier in conjunction with FIGS. 23a-b. In other words, when said code means are run on the CPU, they correspond to the processing circuit 2011 of the first network element 2010 in FIG. 24a.

The above mentioned and described embodiments are only given as examples and should not be limiting. Other solutions, uses, objectives, and functions within the scope of the accompanying patent claims may be possible.

The invention claimed is:

1. A method for supporting establishment of dual connectivity to a wireless communication network for a wireless device, the method being performed in the wireless device and comprising:
    transmitting a request for a connection to a third network element being a candidate network element for establishing the dual connectivity, the request being transmitted to the third network element over a second wireless link;
    transmitting, to the third network element, information identifying a first network element serving the wireless device with a network function and to which the wireless device is connected via a second network element serving the wireless device with a different network function, the second network element communicating with the wireless device over a first wireless link and said information identifying the first network element to the third network element and being transmitted such that the third network element can establish connectivity to the first network element; and
    transmitting an identifier of the wireless device to the third network element to establish the dual connectivity for the wireless device;
    wherein a synchronous network function, having requirements on processing timing which are strictly dependent on timing of the second wireless link, is served to the wireless device by the third network element responsive to the establishment of the dual connectivity;
    wherein the different network function is a further synchronous network function having requirements on processing timing which are strictly dependent on timing of the first wireless link; and
    wherein the network function is an asynchronous network function having requirements on processing timing not strictly dependent on the timing of any of the first or second wireless links.

2. The method according to claim 1, further comprising: detecting the third network element.

3. The method according to claim 1, further comprising: receiving a message in response to the transmitted request, confirming that dual connectivity has been established, wherein the message is received from one of the third network element, the second network element, or the first network element via the second or third network element.

4. The method according to claim 1, further comprising: using the established dual connectivity over the first and the second wireless links for at least one of control plane and user plane communication.

5. The method according to claim 1, wherein the first and the second wireless links are each associated with different radio access technologies.

6. The method according to claim 1, wherein the information identifying the first network element is received from the first network element.

7. The method according to claim 1, wherein the information identifying the first network element comprises at least one of the following:

an internet protocol address of the first network element;
a fully qualified domain name of the first network element;
an identity of an interface to the first network element; and
a Uniform Resource Locator of the first network element.

8. A method for supporting establishment of dual connectivity to a wireless communication network for a wireless device, the method being performed by a third network element that is a candidate network element for establishing the dual connectivity for the wireless device, the method comprising:
receiving a request for a connection to the third network element, the request being received from the wireless device over a second wireless link;
receiving, from the wireless device, an identifier of the wireless device and information identifying a first network element serving the wireless device with a network function and to which the wireless device is connected via a second network element serving the wireless device with a different network function, the second network element communicating with the wireless device over a first wireless link;
establishing connectivity to the first network element using the information identifying the first network element; and
sending an indication to the first network element that the wireless device has connected to the third network element to establish the dual connectivity for the wireless device, the indication comprising the identifier of the wireless device;
wherein a synchronous network function, having requirements on processing timing which are strictly dependent on timing of the second wireless link, is served to the wireless device by the third network element responsive to the establishment of the dual connectivity;
wherein the different network function is a further synchronous network function having requirements on processing timing which are strictly dependent on timing of the first wireless link; and
wherein the network function is an asynchronous network function having requirements on processing timing not strictly dependent on the timing of any of the first or second wireless links.

9. The method according to claim 8, further comprising:
receiving information related to a context of the wireless device from the first network element in response to sending the indication;
establishing the context of the wireless device according to the received information related to the context.

10. The method according to claim 8, wherein establishing connectivity to the first network element comprises:
locating the first network element based on the received information identifying the first network element; and
establishing connectivity to the located first network element.

11. The method according to claim 8, wherein establishing connectivity to the first network element comprises one of:
selecting an existing secure connection between the third network element and the first network element for establishing the connectivity; or
establishing a secure connection between the third network element and the first network element.

12. The method according to claim 8, further comprising:
receiving a confirmation from the first network element that dual connectivity has been established; and
transmitting a message to the wireless device confirming that dual connectivity has been established.

13. The method according to claim 12, wherein transmitting the message comprises forwarding the confirmation from the first network element to the wireless device.

14. The method according to claim 8, wherein the first and the second wireless links are each associated with different radio access technologies.

15. The method according to claim 8, wherein the information identifying the first network element comprises at least one of the following:
an internet protocol address of the first network element;
a fully qualified domain name of the first network element;
an identity of an interface to the first network element; and
a Uniform Resource Locator of the first network element.

16. A method for supporting establishment of dual connectivity to a wireless communication network for a wireless device, the method being performed in a first network element, the method comprising:
serving the wireless device with a network function, the first network element being connected to the wireless device via a second network element serving the wireless device with a different network function, the second network element communicating with the wireless device over a first wireless link;
upon request from a third network element communicating with the wireless device over a second wireless link, establishing connectivity to the third network element, the third network element being a candidate network element for establishing the dual connectivity for the wireless device;
receiving an indication from the third network element that the wireless device has connected to the third network element, the indication comprising an identifier of the wireless device;
retrieving information related to a context of the wireless device using the identifier of the wireless device; and
responsive to determining to establish the dual connectivity for the wireless device over the first and second wireless links, transmitting the information related to the context to the third network element to establish the dual connectivity for the wireless device over the first and second wireless links;
wherein a synchronous network function, having requirements on processing timing which are strictly dependent on timing of the second wireless link, is served to the wireless device by the third network element responsive to the establishment of the dual connectivity;
wherein the different network function is a further synchronous network function having requirements on processing timing which are strictly dependent on timing of the first wireless link; and
wherein the network function is an asynchronous network function having requirements on processing timing not strictly dependent on the timing of any of the first or second wireless links.

17. The method according to claim 16, wherein establishing connectivity to the third network element comprises establishing a secure connection between the third network element and the first network element upon request from the third network element.

18. The method according to claim 16, further comprising:
transmitting a confirmation to the third network element that dual connectivity has been established.

19. A wireless device configured to support establishment of dual connectivity to a wireless communication network for the wireless device, the wireless device comprising:
   a processor and a memory, the memory containing instructions executable by the processor whereby the wireless device is configured to:
      transmit a request for a connection to a third network element being a candidate network element for establishing the dual connectivity, the request being transmitted to the third network element over a second wireless link;
      transmit, to the third network element, information identifying a first network element serving the wireless device with a network function and to which the wireless device is connected via a second network element serving the wireless device with a different network function, the second network element communicating with the wireless device over a first wireless link and said information identifying the first network element to the third network element and being transmitted such that the third network element can establish connectivity to the first network element; and
      transmit an identifier of the wireless device to the third network element to establish the dual connectivity for the wireless device;
   wherein a synchronous network function, having requirements on processing timing which are strictly dependent on timing of the second wireless link, is served to the wireless device by the third network element responsive to the establishment f the dual connectivity;
   wherein the different network function is a further synchronous network function having requirements on processing timing which are strictly dependent on timing of the first wireless link; and
   wherein the network function is an asynchronous network function having requirements on processing timing not strictly dependent on the timing of any of the first or second wireless links.

20. The wireless device according to claim 19, further configured to:
   detect the third network element.

21. The wireless device according to claim 19, further configured to:
   receive a message in response to the transmitted request, confirming that dual connectivity has been established, wherein the message is received from one of the third network element, the second network element, or the first network element via the second or third network element.

22. The wireless device according to claim 19, further configured to:
   use the established dual connectivity over the first and the second wireless links for at least one of control plane and user plane communication.

23. The wireless device according to claim 19, wherein the first and the second wireless links are each associated with different radio access technologies.

24. The wireless device according to claim 19, further configured to receive the information identifying the first network element from the first network element.

25. The wireless device according to claim 19, wherein the information identifying the first network element comprises at least one of the following:
   an internet protocol address of the first network element;
   a fully qualified domain name of the first network element;
   an identity of an interface to the first network element; and
   a Uniform Resource Locator of the first network element.

26. A third network element being a candidate network element for establishing dual connectivity to a wireless communication network for a wireless device, the third network element comprising:
   a processor and a memory, the memory containing instructions executable by the processor whereby the third network element is configured to:
      receive a request for a connection to the third network element, the request being received from the wireless device over a second wireless link;
      receive, from the wireless device, an identifier of the wireless device and information identifying a first network element serving the wireless device with a network function and to which the wireless device is connected via a second network element serving the wireless device with a different network function, the second network element communicating with the wireless device over a first wireless link;
      establish connectivity to the first network element using the information identifying the first network element; and
      send an indication to the first network element that the wireless device has connected to the third network element to establish the dual connectivity for the wireless device, the indication comprising the identifier of the wireless device;
   wherein a synchronous network function, having requirements on processing timing which are strictly dependent on timing of the second wireless link, is served to the wireless device by the third network element responsive to the establishment of the dual connectivity;
   wherein the different network function is a further synchronous network function having requirements on processing timing which are strictly dependent on timing of the first wireless link; and
   wherein the network function is an asynchronous network function having requirements on processing timing not strictly dependent on the timing of any of the first or second wireless links.

27. The third network element according to claim 26, further configured to:
   receive information related to a context of the wireless device from the first network element in response to sending the indication; and
   establish the context of the wireless device according to the received information related to the context.

28. The third network element according to claim 26, configured to establish connectivity to the first network element by:
   locating the first network element based on the received information identifying the first network element; and
   establishing connectivity to the located first network element.

29. The third network element according to claim 26, configured to establish connectivity to the first network element by:
   selecting an existing secure connection between the third network element and the first network element for establishing the connectivity; or
   establishing a secure connection between the third network element and the first network element.

30. The third network element according to claim 26, further configured to:

receive a confirmation from the first network element that dual connectivity has been established; and transmit a message to the wireless device confirming that dual connectivity has been established.

31. The third network element according to claim 30, configured to transmit the message by forwarding the confirmation from the first network element to the wireless device.

32. The third network element according to claim 26, wherein the first and the second wireless links are each associated with different radio access technologies.

33. The third network element according to claim 26, wherein the information identifying the first network element comprises at least one of the following:
an internet protocol address of the first network element;
a fully qualified domain name of the first network element;
an identity of an interface to the first network element; and
a Uniform Resource Locator of the first network element.

34. A first network element configured to support establishment of dual connectivity to a wireless communication network for a wireless device, the first network element comprising:
a processor and a memory, the memory containing instructions executable by the processor whereby the first network element is configured to:
serve the wireless device with a network function, the first network element being connected to the wireless device via a second network element serving the wireless device with a different network function, the second network element communicating with the wireless device over a first wireless link;
upon request from a third network element communicating with the wireless device over a second wireless link, establish connectivity to the third network element, the third network element being a candidate network element for establishing the dual connectivity for the wireless device;
receive an indication from the third network element that the wireless device has connected to the third network element, the indication comprising an identifier of the wireless device;
retrieve information related to a context of the wireless device using the identifier of the wireless device; and
responsive to determining to establish the dual connectivity for the wireless device over the first and second wireless links, transmit the information related to the context to the third network element to establish the dual connectivity for the wireless device over the first and second wireless links;
wherein a synchronous network function, having requirements on processing timing which are strictly dependent on timing of the second wireless link, is served to the wireless device by the third network element responsive to the establishment of the dual connectivity;
wherein the different network function is a further synchronous network function having requirements on processing timing which are strictly dependent on timing of the first wireless link; and
wherein the network function is an asynchronous network function having requirements on processing timing not strictly dependent on the timing of any of the first or second wireless links.

35. The first network element according to claim 34, configured to establish connectivity to the third network element by establishing a secure connection between the third network element and the first network element upon request from the third network element.

36. The first network element according to claim 34, further configured to:
transmit a confirmation to the third network element that dual connectivity has been established.

37. A computer program product, for supporting establishment of dual connectivity to a wireless communication network for a wireless device, stored on a non-transitory computer readable medium and comprising computer readable code, which when run on the wireless device causes the wireless device to:
transmit a request for a connection to a third network element being a candidate network element for establishing the dual connectivity, the request being transmitted to the third network element over a second wireless link;
transmit, to the third network element, information identifying a first network element serving the wireless device with a network function and to which the wireless device is connected via a second network element serving the wireless device with a different network function, the second network element communicating with the wireless device over a first wireless link and said information identifying the first network element to the third network element and being transmitted such that the third network element can establish connectivity to the first network element; and
transmit an identifier of the wireless device to the third network element to establish the dual connectivity for the wireless device;
wherein a synchronous network function, having requirements on processing timing which are strictly dependent on timing of the second wireless link, is served to the wireless device by the third network element responsive to the establishment of the dual connectivity;
wherein the different network function is a further synchronous network function having requirements on processing timing which are strictly dependent on timing of the first wireless link; and
wherein the network function is an asynchronous network function having requirements on processing timing not strictly dependent on the timing of any of the first or second wireless links.

38. A computer program product, for supporting establishment of dual connectivity to a wireless communication network for a wireless device, stored on a non-transitory computer readable medium and comprising computer readable code, which when run on a third network element being a candidate network element for the establishment of the dual connectivity for the wireless device, causes the third network element to:
receive a request for a connection to the third network element, the request being received from the wireless device over a second wireless link;
receive, from the wireless device, an identifier of the wireless device and information identifying a first network element serving the wireless device with a network function and to which the wireless device is connected via a second network element serving the wireless device with a different network function, the second network element communicating with the wireless device over a first wireless link;
establish connectivity to the first network element using the information identifying the first network element; and send an indication to the first network element that the wireless device has connected to the third network element to establish the dual connectivity for the wireless device, the indication comprising the identifier of the wireless device;

wherein a synchronous network function, having requirements on processing timing which are strictly dependent on timing of the second wireless link, is served to the wireless device by the third network element responsive to the establishment of the dual connectivity;

wherein the different network function is a further synchronous network function having requirements on processing timing which are strictly dependent on timing of the first wireless link; and wherein the network function is an asynchronous network function having requirements on processing timing not strictly dependent on the timing of any of the first or second wireless links.

39. A computer program product, for supporting establishment of dual connectivity to a wireless communication network for a wireless device, stored on a non-transitory computer readable medium and comprising computer readable code, which when run on a first network element, causes the first network element to:

serve the wireless device with a network function, the first network element being connected to the wireless device via a second network element serving the wireless device with a different network function, the second network element communicating with the wireless device over a first wireless link;

upon request from a third network element communicating with the wireless device over a second wireless link, establish connectivity to the third network element, the third network element being a candidate network element for establishing the dual connectivity for the wireless device;

receive an indication from the third network element that the wireless device has connected to the third network element, the indication comprising an identifier of the wireless device;

retrieve information related to a context of the wireless device using the identifier of the wireless device; and responsive to determining to establish the dual connectivity for the wireless device over the first and second wireless links, transmit the information related to the context to the third network element to establish the dual connectivity for the wireless device over the first and second wireless links;

wherein a synchronous network function, having requirements on processing timing which are strictly dependent on timing of the second wireless link, is served to the wireless device by the third network element responsive to the establishment of the dual connectivity;

wherein the different network function is a further synchronous network function having requirements on processing timing which are strictly dependent on timing of the first wireless link; and wherein the network function is an asynchronous network function having requirements on processing timing not strictly dependent on the timing of any of the first or second wireless links.

\* \* \* \* \*

UNITED STATES PATENT AND TRADEMARK OFFICE
CERTIFICATE OF CORRECTION

| | | |
|---|---|---|
| PATENT NO. | : 9,838,917 B2 | Page 1 of 1 |
| APPLICATION NO. | : 14/435290 | |
| DATED | : December 5, 2017 | |
| INVENTOR(S) | : Vikberg et al. | |

It is certified that error appears in the above-identified patent and that said Letters Patent is hereby corrected as shown below:

In the Specification

In Column 3, Line 18, delete "data);" and insert -- data; --, therefor.

In Column 4, Line 48, delete "Re/42" and insert -- Rel-12 --, therefor.

In Column 7, Line 18, delete "illustrated In" and insert -- illustrated in --, therefor.

In Column 8, Line 46, delete "element" and insert -- element. --, therefor.

In Column 23, Line 8, delete "FIG. 20)." and insert -- FIG. 20. --, therefor.

In the Claims

In Column 35, Line 31, in Claim 19, delete "f the" and insert -- of the --, therefor.

Signed and Sealed this
Fourteenth Day of May, 2019

Andrei Iancu
*Director of the United States Patent and Trademark Office*